(12) United States Patent
Goraya

(10) Patent No.: US 8,326,792 B2
(45) Date of Patent: Dec. 4, 2012

(54) ADAPTIVE DYNAMIC PERSONAL MODELING SYSTEM AND METHOD

(75) Inventor: Tanvir Y. Goraya, Bratenahl, OH (US)

(73) Assignee: Theory Garden, LLC, Chagrin Falls, OH (US)

( * ) Notice: Subject to any disclaimer, the term of this patent is extended or adjusted under 35 U.S.C. 154(b) by 957 days.

(21) Appl. No.: 12/345,982

(22) Filed: Dec. 30, 2008

(65) Prior Publication Data

US 2009/0228425 A1    Sep. 10, 2009

Related U.S. Application Data

(63) Continuation of application No. 10/135,159, filed on Apr. 30, 2002, now abandoned.

(60) Provisional application No. 60/287,536, filed on Apr. 30, 2001.

(51) Int. Cl.
*G06F 17/00* (2006.01)
*G06N 7/00* (2006.01)
*G06N 7/08* (2006.01)

(52) U.S. Cl. ......................................... 706/59

(58) Field of Classification Search .................. None
See application file for complete search history.

(56) References Cited

U.S. PATENT DOCUMENTS

| | | | |
|---|---|---|---|
| 4,802,103 A | 1/1989 | Faggin et al. | |
| 5,416,890 A * | 5/1995 | Beretta | 345/590 |
| 5,732,192 A | 3/1998 | Malin et al. | |
| 5,769,793 A | 6/1998 | Pincus et al. | |
| 5,901,246 A | 5/1999 | Hoffberg et al. | |
| 5,991,846 A * | 11/1999 | Ooki | 710/241 |
| 6,012,152 A | 1/2000 | Douik et al. | |
| 6,063,028 A | 5/2000 | Luciano | |
| 6,078,901 A | 6/2000 | Ching | |
| 6,317,731 B1 | 11/2001 | Luciano | |
| 6,405,159 B2 | 6/2002 | Bushey et al. | |
| 6,411,098 B1 | 6/2002 | Laletin | |
| 6,418,424 B1 | 7/2002 | Hoffberg et al. | |
| 6,850,252 B1 | 2/2005 | Hoffberg | |
| 2001/0011211 A1 | 8/2001 | Bushey et al. | |
| 2001/0054032 A1 | 12/2001 | Goldman et al. | |
| 2002/0052858 A1 | 5/2002 | Goldman et al. | |
| 2002/0059158 A1 | 5/2002 | Goldman et al. | |

OTHER PUBLICATIONS

'Neural-expert hybrid approach for intelligent manufacturing: A survey': Huang, 1995, Elsevier, Computers in Industry, 0166-3615, pp. 107-126.*

'Dynamic PDE surfaces with flexible and general geometric constraints': Du, 2000, IEEE, 0-7695-0868, pp. 213-222.*

(Continued)

*Primary Examiner* — Kakali Chaki
*Assistant Examiner* — Peter Coughlan
(74) *Attorney, Agent, or Firm* — Renner, Otto, Boisselle & Sklar, LLP

(57) ABSTRACT

The present invention provides a system and method for building and analyzing a quantitative model from qualitative tacit knowledge. In one aspect of the present invention, there is provided a system for creating and analyzing a model of a user's semantic knowledge. The semantic knowledge model is based on cause and effect relationships as defined by the user. In another aspect of the present invention, there is provided a system for creating and analyzing a model of a user's episodic knowledge. The episodic knowledge model is based on the user's past experiences, including recalled stimuli and responses. The semantic and episodic models are used to describe the users internal mental model.

12 Claims, 26 Drawing Sheets

OTHER PUBLICATIONS

'Integrating AI and optimization for decision support: A survey': Dutta, Elsevier, Decisions support systems, 1996, 0167-9236, pp. 217-226.*

'Goraya. T. Y., Soclof M. S., Yan D. G., Meng Z. Metal-casting process design: Postmortem and Predictive troubleshooting', Apr. 1997, [retrieved on Nov. 1, 2011], Retrieved from the Internet<http://www.tms.org/pubs/journals/JOM9704/Goraya/Goraya-9704.html>.*

International Search Report for corresponding application No. PCT/US02/13483 dated Sep. 16, 2002.

Shrager, et al. Issues in the Pragmatics of Qualitative Modeling: Lessons Learned from a Xerographics Project; Communications of the ACM vol. 30., No. 12., (Dec. 1987), pp. 1036-1047.

Hudlicka, et al., Integrating Casual Reasoning at Different Levels of Abstraction; ACM Special Interest Group on Artificial Intelligence, (1988) 0-89791-271-3/88/0006/0157, pp. 157-163.

Miller, et al., AI: What Simulationists Really Need to Know; ACM Transactions on Modeling and Computer Simulation, vol. 2, No. R, Oct. 1992, pp. 269-284.

Ingalls, et al., Interval Time Clock Implementation for Qualitative Event Graphs; Proceedings of the 1994 Winter Simulation Conference (ACM), pp. 574-580.

Kiang, et al., Long-term and Short-term Strategic Planning in a Business Environment—A Qualitative Reasoning Approach; ACM Special Interest Group on Management Information Systems (1990). ACM 089791-416-3/90/0010/0337, pp. 337-354.

Berleant, et al., Probabilities of Qualitative Behaviors for Dependability Analysis of a Fault-Tolerance Model; ACM Special Interest Group on Applied Computing, (ACM), 1992 ACM 0-89791-502-X/92/0002/0883.

Erragumtla, et al., An Architecture of a Knowledge-Based Simulation Engine; Proceedings of the Winter Simulation Conference (ACM), pp. 673-680.

* cited by examiner

Statistics

| Episode Name | Minimum | Maximum | Mean | Median | Mode | Std. Deviation |
|---|---|---|---|---|---|---|
| E1 | .0000 | .9000 | .3727 | .5000 | .0000 | .4002 |
| E2 | .0000 | 1.0000 | .5818 | .7000 | .9000 | .3430 |
| E3 | .0000 | 1.0000 | .3545 | .5000 | .0000 | .3959 |
| E4 | .0000 | 1.0000 | .5818 | .8000 | 1.0000 | .4355 |
| E5 | .0000 | 1.0000 | .1818 | .0000 | .0000 | .3816 |
| E6 | .2000 | 1.0000 | .5000 | .5000 | .5000 | .1612 |
| E7 | .0000 | 1.0000 | .3545 | .5000 | .0000 | .3475 |
| E8 | .0000 | 1.0000 | .7545 | 1.0000 | 1.000 | .3725 |
| E9 | 1.000 | 1.0000 | .8545 | 1.0000 | 1.000 | .3267 |
| E10 | .0000 | 1.0000 | .5364 | .5000 | .5000 | .3585 |
| Factor Name | | | | | | |
| SGA_size | .0000 | 1.0000 | .4800 | .5000 | .5000 | .3882 |
| Part._Tbl. | .0000 | 1.0000 | .5000 | .7500 | .0000 | .4714 |
| B.U.&Arch. | .0000 | 1.0000 | .4400 | .7000 | .0000 | .4858 |
| Imp&Exp | .0000 | 1.0000 | .5400 | .7000 | .0000 | .4274 |
| #Sim._U&Q | .0000 | 1.0000 | .7900 | 1.0000 | 1.0000 | .3315 |
| Off-Peak | .0000 | 1.0000 | .7000 | 1.0000 | 1.0000 | .4110 |
| Inx.+Tbl | .0000 | 1.0000 | .4400 | .5000 | .0000 | .3748 |
| SQL-Imp.WHERE | .0000 | 1.0000 | .4700 | .6500 | .0000 | .4523 |
| Time | .1000 | 1.0000 | .4100 | .6000 | .6000 | .2183 |
| Space | .0000 | 1.0000 | .1300 | .2000 | .0000 | .1418 |
| DBA_Load | .3000 | 1.0000 | .6800 | .7500 | .5000 | .2251 |

*Fig. 9*

ADAPTIVE DYNAMIC PERSONAL MODELING SYSTEM AND METHOD

CROSS-REFERENCE TO RELATED APPLICATIONS

The present application is a continuation of U.S. patent application Ser. No. 10/135,159, filed Apr. 30, 2002, now abandoned which claims the benefit under 35 USC 119 of U.S. Provisional Patent Application Ser. No. 60/287,536, filed Apr. 30, 2001. Both of the above applications are incorporated herein by reference in their entireties.

BACKGROUND OF THE INVENTION

The present invention pertains generally to field of artificial intelligence, and more specifically to a method and system for adaptively and dynamically converting qualitative human judgments into quantitative mental models.

Epistemology is the branch of philosophy that studies the nature of knowledge, its presuppositions and foundations, and its extent and validity. Within the epistemology community, there is no generally accepted explanation for how tacit, experiential, subconscious and qualitative knowledge, judgments, skills, gut-feelings, and intuition actually work. There is, however, a general consensus regarding the existence of two basic types of knowledge: explicit and tacit.

While some epistemologists may define the terms "tacit knowledge" and "intangible knowledge" differently, the two terms are used interchangeably herein. Tacit knowledge can be defined as the indescribable and intractable, yet commonplace knowledge that people acquire and possess by virtue of their experience. It is knowledge that is tempered by social and organizational norms, as well as personal predilections. Therefore, it is dynamic and evolves and refines over time. For example, a master craftsman is a superior craftsman due to decades of experience and his modus operandi is tempered by the norms of the environments to which he has been exposed, reflecting his personal artistic tastes and biases. His tacit, amorphous, or intangible knowledge is visible in his work. Furthermore, he is able to make a wide variety of decisions without being able to exactly explain the reasons for his acts, much less provide precise rules.

However, an expert, such as a master craftsman, has no mechanism for analyzing and interacting with his own tacit knowledge. There is no method for engaging in a hermeneutic dialog with his personal mental-model or intellectual text. Experts cannot ask their personal mental-model to find solutions for constrained, weighted goals. They have no techniques for reflecting upon their knowledge-selves from various perspectives and combinations of relative weights and constraints applied to their mental-models. Unfortunately, creating a means for interacting with a tacit knowledge mental-model is particularly difficult from a practicality standpoint, and elusive from a theoretical standpoint. In order to effectively interact with a tacit knowledge mental-model, one might convert tacit knowledge into explicit knowledge. However, from a theoretical standpoint, such a conversion is problematic. If tacit knowledge is indeed tacit then how can it be made explicit? Furthermore, if tacit knowledge can be made explicit, is it tacit knowledge?

Different experts might perform identical tasks differently. Sometimes, the same expert might perform the same task differently at different times. Attempting to map tacit knowledge in itself is an ambitious and ill-structured intractable problem. For instance, even if one were to ignore the recondite nature of tacit knowledge and computational limitations, an attempt to encode and execute such voluminous knowledge is likely to cause a combinatorial explosion. A combinatorial explosion can be illustrated by a chessboard having sixty-four squares wherein a single grain of rice is placed on the first square, two grains on the second square, four grains of rice on the third square, and wherein the amount of rice placed on each subsequent square is double the amount placed on the previous square.

Unfortunately, a decision-maker is not necessarily aware of how he arrives at a particular decision and of his own tacit knowledge. Humans have biases and differ in how they process information and make decisions. Intuitive decision-makers approach a problem with multiple methods, using trial and error to find a solution. It has been argued that choices are not made, but are continuously being modified to accommodate changing objectives, environments, value preferences and policy alternatives provided by the decision-maker. Knowledge is created by cycling through active experimentation and reflective observation.

There exists a need to capture an expert's tacit knowledge that exists as complex cause and effect relationships and past episodes. Most knowledge-based systems are concerned with the explicable knowledge. Furthermore, existing tools for capturing knowledge mainly comprise simple maps, lists, narrative, and causal diagrams. Experts, in various walks of life, make decisions based on judgment, gut-feel, and intuition, because they can draw upon years of hands-on learning and past experiences. Such experts are precious intellectual assets of an organization, and when they leave, the organization is drained of decades of experience. To date, there have been no computer-based methods to quantify and retain this type of judgmental knowledge. Existing techniques, such as rule-based expert systems, only retain brittle perceptions of the experts, not their expertise. Also, they are very expensive and require months or even years to build.

Typical Knowledge Process Management

While there is no satisfactory method to elicit tacit or intangible knowledge, there are methods for extracting explicit knowledge. Typically a knowledge engineer or a moderator interacts with an expert. The knowledge engineer engages in a question and answer session with the expert to elicit explicit knowledge. In artificial intelligence ("AI"), the knowledge engineer might use techniques that are suitable for a particular expert system or programming environment. In a social science environment, the moderator might use techniques such as analytical hierarchy process ("AHP"), cause-mapping, drawing on a surface, interviews, and narrative, etc.

As a result of these knowledge acquisition techniques, the knowledge engineer assembles a body of knowledge, which he structures into a formal document in a form suitable for encoding into a rule-based expert system or systems dynamics modeling package. The analyst takes the documents from the knowledge engineer and prepares system design documents in the form of data flow diagrams ("DFD"), flowcharts, entity relationship diagrams ("ERD"), etc. The system design documents are then given to a programming team, which codes the received information into a software program. If the system is declared acceptable, then potential users are trained on the software. In some instances, however, the expert is not even involved in the use of the software or does know how to use it. At this point, the knowledge acquisition from the expert typically ends. However, if the system is found to be unacceptable, the entire process must be repeated, from the quest and answer session with the expert.

This method for knowledge process management is problematic for a number of reasons. First, a disconnect exists between the expert and the software program, or system. This disconnect creates a situation where the knowledge engineer inadvertently adds his own bias. In addition, the analyst and programming team add or remove from the knowledge because of constraints such as system document design, requirements or limitations of the programming environment, or of the expert system shell. Also, because the system contains only explicable knowledge, the expert may not be able to explicate his know-how, and he may even be aware of the skills he has acquired. In addition, different knowledge workers may approach the same problem differently based on their personal sets of biases, skills, and experiences. Additionally, because of the crisp rules-based programming, the system does not allow interpolation and is impossible to test comprehensively by firing all of the rules due to combinatorial explosion. Furthermore, the system is fairly static in that once built, implementing changes is problematic. In other words, the system is inadequate because it is costly, it does not permit direct interaction with the expert, it does not contain tacit knowledge, it is strictly rule-based, and it is not adaptable.

Existing Techniques

When viewed individually from the perspective of constructing an environment to map cognition onto computation for creating an adaptive interactive environment that captures intangible knowledge, existing techniques have many shortcomings. The primary reason is that these tools assume a rational decision-making homoeconomicus and go to extra lengths to remove human judgment from knowledge elicitation and model building processes. In doing so, they remove the very ingredient necessary for tacit knowledge.

On line Analytical Processing ("OLAP") based decision-support systems are popular for storage, manipulation, slicing and dicing, and presentation of data. These system include variations of OLAP, such as relational OLAP ("ROLAP"), multidimensional OLAP ("MOLAP"), hybrid OLAP ("HOLAP"), etc. and can be used for representing and manipulating axiomatic human knowledge in order to present the facts from multiple perspectives. OLAP systems are problematic for a variety of reasons. First, dimensions are pre-assigned by the architect, which implies inflexibility in scaling the views. Also, in order to provide a reasonable response time, less than 5 seconds, data has to be precomputed for performance purposes. OLAP also suffers from the curse of dimensionality. Published benchmarks of OLAP products show a data explosion factor of 240, requiring 2.4 GB of storage to manage 10 MB of input data. Finally, the heuristics or AI used in OLAP are based on mathematical models which may or may not correspond to actual usage patterns.

Probablistic systems both conventional and Bayesian, are impractical for dynamic environments first because the sum of all probabilities must equal one, and second because a priori probabilities must be known in order for the system to work. In order to counter this problem, some systems use frequency-based probabilities. Such an approach negates the essence of probability theory and renders it difficult to ascribe any reasonable degree of certainty to the outcomes.

Bayesian Belief Networks are inspired by the work of Reverend Thomas Bayes' philosophy and integrate a frequency-based approach, based on probabilistic statistical theory, with a tree-like structure. Bayesian Belief Networks share many limitations and problems with Bayesian probability based systems in a dynamic environment. The tree-like architecture and references to frequencies of occurrence of events make it impractical for use as a general-purpose solution.

Uncertainty theories are generally ad-hoc theories with ad-hoc solutions. One example is the well-respected Dempster-Schaffer Theory of Uncertainty. This theory, like many others, basically relaxes the tenants of probability theory. In addition, it combines it with set theory to incorporate and account for uncertainty. The result is an extremely complex system that requires a full-time mathematician or an AI expert for maintenance. These systems are not adaptive because of their reliance on up-front custom designs and become prohibitive because of their high design and maintenance costs.

Statistics is one of the most important sciences of modern times. Although we make many decisions based on statistics, it is problematic when used for knowledge management. First, statistics require Design of Experiments ("DOE"), a carefully controlled set of results by running an experiment in a controlled environment at specific data points in a problem space. This approach is not possible in real-life dynamic situations. If the DOE is violated then the confidence in statistical analysis cannot be held. Secondly, when modeling a process, statistical analyses hold true under strict conditions. For example, it is generally assumed that relationships between objects are linear. This assumption is far from true in the highly nonlinear real world. Statistics can model moderately more complex, or nonlinear, relationships but at the cost of accuracy and certainty. Third, statistics are not adaptive in that they do not learn while maintaining existing knowledge. Fourth, statistical solutions are static. That is, if there is a change in any variables or if a variable is added or removed then the entire results must be recomputed. This makes statistical analyses inappropriate for dynamic environments.

Numerical vector analysis is based on a distance metric such as the Minkowski Metric. The basic concept is that of a metric to define distance or closeness that correspond to dissimilarities and similarities. Euclidean Geometry is a special case of this metric and is commonly used. The first step is to define a vector space and then to populate it with data. Each data point is represented as a vector in multi-dimensional space. The vectors, which lie close to each other, are considered to be similar with a certain degree of certainty. This is basic categorization of data. These methods work well with numeric data but are of very little help when dealing with text. The reason is that it is almost impossible to define a distance metric between words. For example, what is the distance between "cold" and "epistemology"? There are various quasi-distance metrics for text that mostly use set theory.

Rule-based expert systems gained popularity during the 1980's. These systems are composed of rules provided by an expert and a mechanism to invoke the rules using forward- or backward-chaining algorithms. Knowledge acquisition for is a bottleneck for such systems. It is time-intensive and iterative human-intensive activity requiring systems analysis, interviewing, and interpersonal skills. Experts may consciously or sub-consciously have ulterior motives not to be forthcoming with the entire or best information. Rule-based systems require domain experts, considerable time, and knowledgeable engineers who have familiarity with the domain. Experts may be too busy, difficult to deal with, or unwilling to part with knowledge. There is not enough understanding of how to represent commonsense knowledge. These systems are not adaptive—they do not learn from mistakes. Readjusting them can be a huge task. It is not easy to add meaningful certainty factors on many rules. There can be conflicting sources of expertise. These systems have low fault-tolerance and exhibit inelegant degradation because they deal with crisp rules.

Each of these factors considerably increases the cost of building and maintenance. These systems are not adaptive, that is they do not learn from previous mistakes. Furthermore, as the size of a problem increases the number of rules increases, resulting in high complexity, higher costs, and ultimately an unmanageable system. Even addition of one more rule can have unexpected effects. Therefore, these systems are useful when there are only a handful of rules, when the problem domain is well defined in advance, where the system is static, the knowledge engineers are unbiased and experts are willing to part with their knowledge. Even when experts are willing to part with their knowledge they will only be able to describe their explicit knowledge, not their tacit or implicit knowledge, gut-feel, know-how, experiential knowledge, and intuition.

Artificial Neural Networks ("ANN") are mathematical representations of massive parallel processing systems loosely modeled after the biological brain. During the 1990s these systems saw a resurgence after almost three decades of quiescence. ANNs can learn and discover relationships, or mathematical mappings, between causes and effects from datasets. They can also be used for mapping, optimization, and auto- and hetero-associative memories. Common problems with ANNs are their inability to explain their behavior—black box nature, overfitting of data, introduction of noise, introduction of high degrees of nonlinearity, overtraining, memory effect, difficulties with generalization or regularization. Properly designing the architecture, preparing pristine data, training, and interpreting the results requires an understanding of mathamatics, probability, statistics, nonlinear multiple criteria optimization, and the problem domain. The biggest strength of neural nets—their ability to learn any relationship is perhaps also one of their biggest shortcoming, since they can learn noise and assume existence of improper relationships.

The present invention overcomes these problems by carefully segregating pockets of dense data points from the sparse dataset, by holding back data for regularization, by using optimization algorithms for locating the best optimum in synaptic weight space, and by parsimonious use of neurons.

Fuzzy Logic is an extension of classical logic. It is concerned with approximate instead of exact reasoning. It allows use of fractions instead of two discrete values. Fuzzy logic is an inexact reasoning technique, which uses the concept of degrees of membership in a set. This is an improvement because it allows the use of such concepts as hot, warm, lukewarm, . . . , cold, etc., whereas classical logic could only allow for two concepts such as hot and cold. Fuzzy systems are particularly successful in control applications in industrial processes and consumer goods as embedded components. An example of its success is the braking system of Bullet Trains. Fuzzy logic has only been successfully applied in systems with a small number of variables. Fuzzy logic requires a great deal of knowledge of the problem domain. The number of rules can grow exponentially with the number of variables and number of possible choices, rendering even a moderate problem incapable of implementation.

Success can be achieved by building and extensively fine-tuning each particular fuzzy logic system specific to a well-defined task. Fuzzy logic can provide model-free information. However, fuzzy logic has not yielded tools to easily convert qualitative information into a robust quantitative model. Fuzzy systems are not adaptive. Constructing and validating a rule base is an iterative and difficult task. Experts and time are needed to design, construct, validate and fine-tune fuzzy systems. This includes manually tuning membership functions and fuzzy rules. Fuzzy systems become very expensive as size and complexity of the problem increases. It is not easy to prove that during operation a fuzzy system will remain stable and not become chaotic because it can be very sensitive outside its operating range. There are also mathematical criticisms of fuzzy logic that under certain conditions fuzzy logic collapses to two-value logic—the paradoxical success of fuzzy logic. Fuzzy systems also lack audit trails.

Another major difficulty is in defuzzification. There are no consensus methods for automatically applying defuzzification. This means that each system has to be carefully hand-crafted for a particular problem and it is neither scalable nor adaptive. This ultimately increases both the computational and design costs. The task of defuzzification is not only quite complex but also controversial. Generally, iterative trial and error and approximations are required to defuzzify results into a meaningful and acceptable form. Defuzzification alone makes the idea of fuzzy logic based tools unsuitable for building robust generalizable models.

Fuzzy logic has achieved modest success in model building in concert with other model building methods such as expert systems. But even in hybrid systems many of the above mentioned difficulties remain. Some of the more successful methods have combined neural nets with fuzzy logic to address some of these problems, e.g., Adaptive Network Fuzzy Inference System ("ANFIS").

Judgmental Bootstrapping ("bootstrapping") is a method used in forecasting to create quantitative models from human judgments. There are two types of judgmental bootstrapping: direct and indirect. The primary difference between bootstrapping and other expert systems is that for bootstrapping, experts are not asked to furnish rules; instead rules are "inferred" from their behavior. A quantitative model of an expert's rules is constructed by observing his judgments while he makes forecasts. Generally expensive protocol studies are required to gather this data. The causal variables used by the expert are treated as independent variables and his forecasts as dependent variables. From this observed data, ordinary least square regression is used to formulate linear quantitative relationships between the forecasts and the causal variables. The resulting mathematical equations or models represent the expert's rules.

Bootstrapping has some limitations. It requires the delicate task of observing experts during the performance of their tasks and translating the observations into numeric form. This raises fundamental socio-behavioral issues such as the Hawthorne effect, observational observations and dual interpretation process of distinguishing between "act meaning" (meaning of act to the actor) and "action meaning" (meaning of act as observer's subject matter). Bootstrapping models are not adaptive. These models, which are often supposed to aid experts, are not easily modifiable especially by the experts. Modifications may be necessary when either the expert's mental model or the external environment have changed. The model needs to be reformulated from scratch when many changes occur such as addition of new causal variables.

Extrapolation is also a concern. Reported studies have used cross-sectional data instead of time series data. The major problem, which is lack of adaptation remains even if experts are involved in validating and using their models. When modifying models, usually existing models have to be abandoned and new models need to be formulated from ground zero. Although much less data are required than, for example, conjoint analysis, at least five to ten experts are typically needed for useful bootstrapping models. In addition, since regression is used to build the model all the shortcomings of statistical regression also influence bootstrapping.

Analytic hierarchy process ("AHP") is a "multicriteria decision model that uses hierarchic or network structure to represent a decision problem and then develop priorities based on decision-maker's judgments throughout the system. AHP has been applied with success in areas where judgment is to be taken into consideration such as facility location analysis, work scheduling, planning, capital budgeting and technology transfer. One advantage of AHP is its ability to measure consistency. The most important limitation of AHP is exhibited when the ranks determined for alternatives through the AHP change as new alternatives are added. Dyer proposed that this problem could be addressed if weights were expressed using an interval scale as opposed to the ratio scale. This requires borrowing concepts from multiattribute utility theory. Some have opposed this method of correction, arguing that AHP is a standalone body of research not an extension of multiattribute utility theory.

Some other technologies worth mentioning include Systems Dynamics Modeling, Simulated Annealing, and Markov and Hidden Markov Processes. None of these provide adequate means for mapping cognition onto computation and its inverse.

BRIEF SUMMARY OF THE INVENTION

It is therefore an object of the present invention to provide a method and system for building and analyzing a quantitative model from qualitative tacit knowledge.

In accordance with the present invention, there is provided a method for building and analyzing a quantitative model from qualitative tacit knowledge. According to the method, a plurality of cause factors and a plurality of effect factors are received. A plurality of a plurality of defined cause and effect relationships are also received, wherein each defined cause and effect relationship comprises a relationship value corresponding to a degree of influence that a selected cause factor has on a selected effect factor. A means for holistically analyzing the plurality of cause and effect relationships is provided.

Also in accordance with the present invention, there is provided a method for building and analyzing a quantitative model from qualitative tacit knowledge. According to the method, a plurality of episodes are received, wherein each episode comprises a plurality of cause factors and a plurality of effect factors. A plurality of defined cause and effect relationships are also received, wherein each defined cause and effect relationship comprises a value corresponding to a degree of influence that a selected cause factor in an episode has on a selected effect factor within the same episode. Defined relationships in a first episode are then matched with defined relationships in a second episode such that the matched relationships have the same cause factor and the same effect factor. A function is then derived from the matched defined relationships such that the derived function describes a relationship between causes and effects across episodes. A means for holistically analyzing the plurality of cause and effect relationships is provided.

BRIEF DESCRIPTION OF THE DRAWINGS

FIG. 9 illustrates an output screen showing general statistics;

DETAILED DESCRIPTION OF THE INVENTION

The present invention provides a system and method for capturing and preserving one's tacit knowledge. In doing so, it provides a unique computer environment, based upon advances in artificial intelligence, which captures and retains tacit judgmental type knowledge in a computer and transforms sparse qualitative data into mathematical models.

Figure 1:
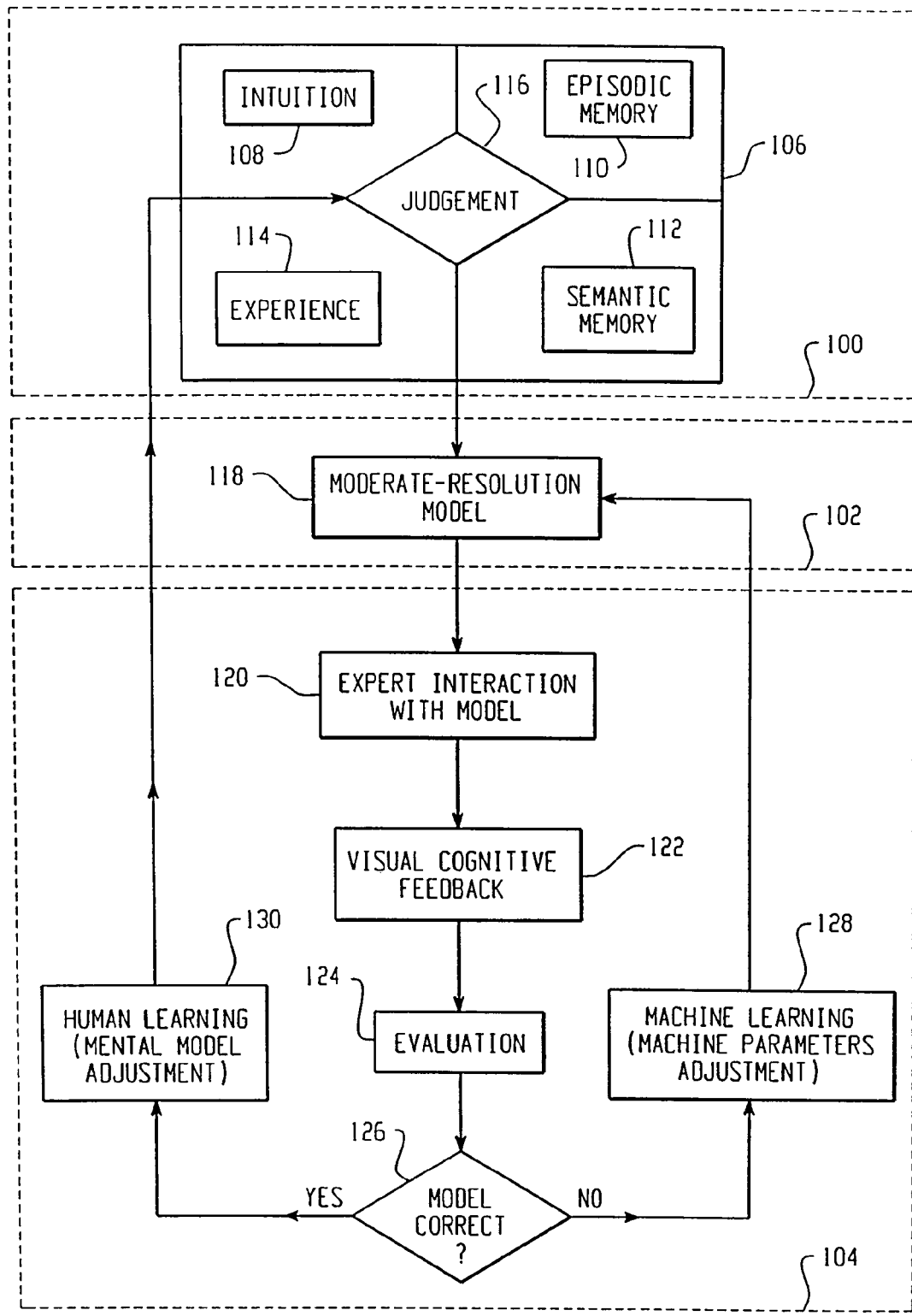
FIG. 1 represents the overall conceptual framework for the present invention.

Turning now to FIG. 1, the overall conceptual framework for the present invention is provided. The framework suitably comprises three basic environments: an expert environment 100, a computing environment 102, and an interaction environment 104 for facilitating interaction between human and machine. Within the expert environment 100, there exists an expert's mental model 106, which suitably comprises intuition 108, which is a tacit, non-explicit type of knowledge. Intuition can also be described as intangible amorphous knowledge. An expert's mental model 106 also comprises episodic memory 110, semantic memory 112, and experience 114. An expert utilizes his mental model 106 to exercise judgment 116.

The expert's judgment 116 is used to create a moderate-resolution model 118 in the computing environment 102. In the computing environment 102 an expert uses his judgment 116 to creates and then maintain a moderate-resolution model 118, which is a computer-based rendition of his mental-model. The moderate-resolution model 118 is preferably an aggregate of least two models: a semantic model and an episodic model.

In the human-machine environment 104, an expert interacts with the model 118 at process block 120. The expert suitably interacts with the model 118 by asking questions, discovering categories, assigning relative weights, assigning costs to goals, and performing goal seeking. During interaction at process block 120, the expert suitably performs categorization, what-if analyses, and/or multi-criteria optimization. The mechanics of the underlying computational machines are preferably hidden from the expert such that the expert sees only easy-to-use controls. The results are suitably provided via visual cognitive feedback at process block 122. The results of his queries are preferably presented to him in easy-to-interpret and manipulable colorful graphics. The expert is preferably able to create queries out of the results, thus engaging in a cyclical hermeneutic type interaction.

Progression then continues to process block 124 wherein the expert evaluates the results obtained from interacting with the system in light of his judgment 116 mental model 106. Flow then progresses to decision block 126 wherein a determination is made whether the model 118 coincides with the expert's mental model 106. A positive determination at decision block 126 causes progression to process block 130 wherein the expert suitably engages in an adjustment of his mental model 106 based on the results returned by the model 118. In other words, the expert is enlightened as to his mental model 106 through analysis of the results returned.

A negative determination at decision block 128 causes progression to process block 128 wherein the parameters used to create model 118 are adjusted. In the presently preferred embodiment, the invention comprises an Adaptive Conjunctive Feedback Mechanism ("ACFM"), which provides the expert with the capability to modify the model 118 upon evaluation of the results such that the model more closely matches his mental model 106. If he feels that the result is incorrect then he can click and drag on the result's graphical representations to bring them to the values that he thinks ought to be. The ACFM then automatically adjusted the model 118 such that the model learns the changes applied by the expert. In addition to teaching or correcting a model, these features also allow for adaptation of the model as the expert grows.

Figure 2:
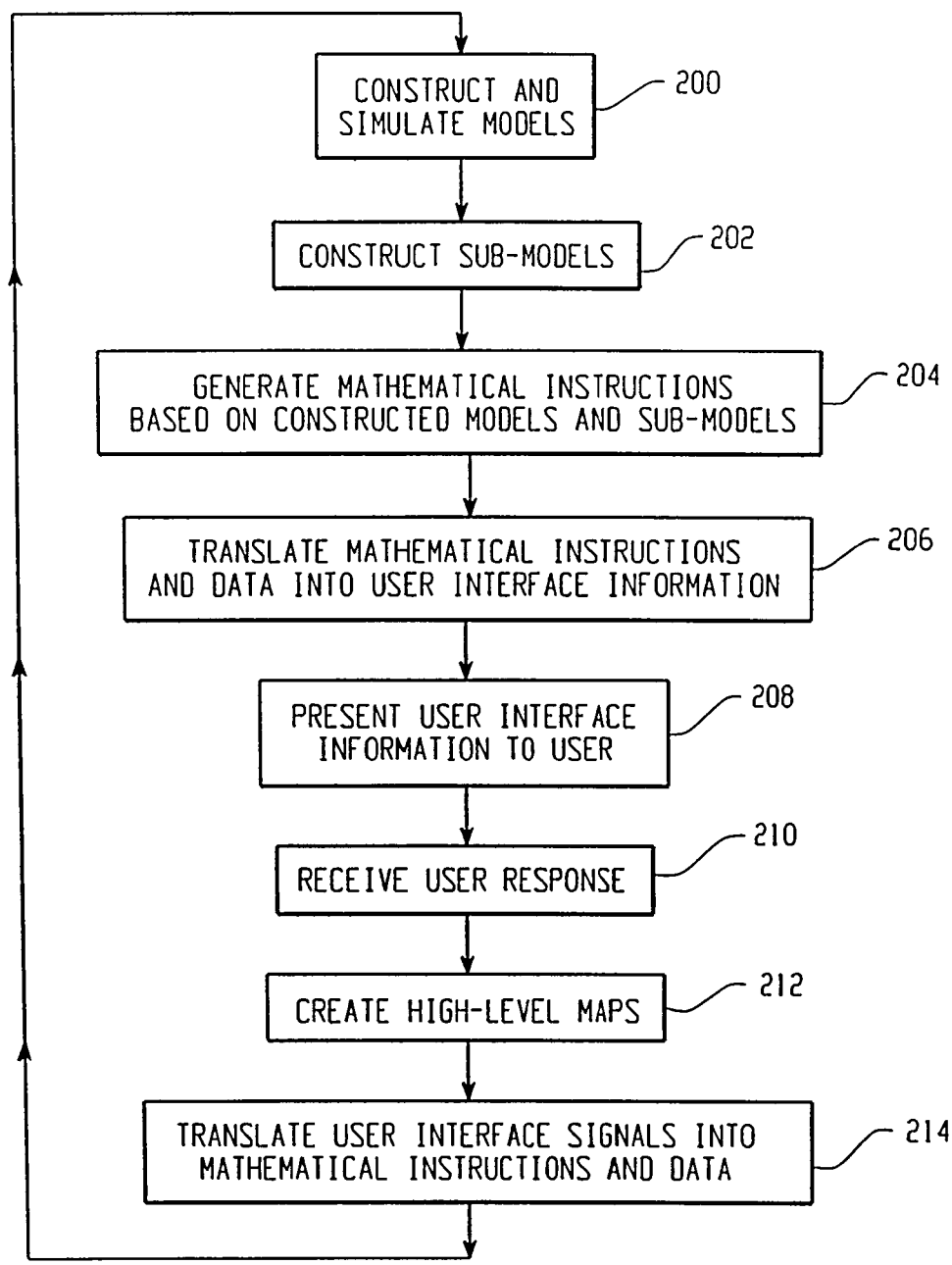
FIG. 2 is a flow chart representing the system functionality in response to a user's hermeneutic tacking back and forth according to the present invention.

Turning now to FIG. 2, a diagram representing the system functionality in response to a user's hermeneutic tacking back and forth according to the present invention is provided. The basic flow commences at process block 200 wherein models, such as model 118 are constructed and simulated. Progression then flows to process block 202 wherein sub-models are constructed. In other words, model sub layers are suitably constructed. Such construction is suitably accomplished through the use of a plurality of engines, which are computer readable code, and are suitably software components. In the presently preferred embodiment, such engines include a Self Adaptation System; a mapping system that is preferably a non-linear mapping system; an episodic memory system; an Optimization/Goal Seeking System; an Adaptive Clustering System; a Ranking System; an ACFM; and a Plotting/Graphing Engine.

Progression continues to process block 204 wherein mathematical instructions and data representative of the constructed models and sub-models are generated. Flow then continues to process block 206 wherein the generated mathematical instructions and data are translated into user interface ("UI") information. This translation is suitably accomplished by any method as will be appreciated by those skilled in the art. Preferably, the mathematical instructions are translated into graphical user interface ("GUI") information.

Progression then flows to process block 208 wherein the generated UL information is presented to the user. In the presently preferred embodiment, GUI information is presented to a user in the form of graphs, such as three-dimensional graphs, clusters showing relative rankings, results of goal seeking, etc. In addition, the presented GUI information is preferably interactive. Flow then continues to process block 210 wherein a user response is received. The GUI is preferably equipped with user-friendly controls, such as sliders, buttons, checkboxes, etc.

Preferably, the user response is received from a keyboard, mouse, touch screen, or other input device as will be appreciated by those skilled in the art. Progression then continues to process block 212 wherein maps are created based on responses received from the user. The maps are suitably high-level maps that facilitate user interaction through I/O devices. Following creation of high-level maps and user interaction, progression flows to process block 214 wherein the user interface signals received during interaction with the user interface are translated into low-level mathematical instructions and data. Flow then loops back to process block 200 wherein the mathematical instructions and data are used to construct and simulate models.

The present invention comprises a plurality of systems and engines. First, the system comprises at least two memory based modeling systems: a semantic model ("s-model") and an episodic model ("e-model"). Additional models are also suitably included in the system. The s-model is created from the supposed mapping of the semantic memory or cause and effect relationships that an expert is capable of expressing. In the presently preferred embodiment, the s-model is a linear model that utilizes parallel distributed processing representation. The e-model is constructed from past experiences of an expert and is designed to mimic episodic memory. In the presently preferred embodiment, the e-model is a nonlinear model that utilizes parallel distributed processing representation.

The present invention also comprises an interactive adaptive categorization system ("ACS"). The ACS allows entered data to be categorized and viewed from various perspectives. In the presently preferred embodiment, the ACS is a hierarchical, agglomerative, adaptive, neural network representation of computational machinery that uses the Minkowski metric of second order or Euclidian distance metric for numeric categorization. An expert can engage in a dialog with the categorization engine through a user interface and can increase or decrease a similarity measure to a desired level. The categorization results are preferably presented in color and as dendrograms.

The present invention further comprises a plurality of optimization systems. Optimization is the selection of the best item or combination of items from a group of many items or combinations thereof. The presently preferred embodiment is capable of performing a plurality of optimization methods. The system is preferably capable of performing optimization by the Adaptive Flexible Tolerance method, which is based upon the flexible tolerance method, also known as the amoeba search algorithm, as will be appreciated by those skilled in the art. The present invention also comprises Evolutionary Programming optimization functionality, which employs a method that uses genetic algorithms. The Adaptive Flexible Tolerance and Evolutionary Programming optimization methods are particularly useful for optimization with nonlinear models. The present invention further comprises Corner Solutions optimization functionality, which employs a simple search method that searches for best solutions at corners of a search space. The Corner Solutions optimization method is particularly useful for optimization with linear models.

In the preferred embodiment, the basic algorithms are enhanced to include constraints and relative weights and are capable of learning from their experiences as they optimize different problems. While the enhancements do allow the system to make generalizations for all types of problems since each problem has a different solution space, they do improve results when searches are conducted on the same or similar solution spaces. This also enhances their ability to overcome local optima as more searches are carried out on the same or modified versions of a solution space. Preferably, the algorithms are capable of dynamically adjusting their parameters as a search continues. This functionality is particularly useful when an expert does not have any knowledge of the underlying computational machinery, which is the case in the presently preferred embodiment. If an expert is knowledgeable in the field of computational intelligence, the system preferably comprises a parameters screen whereby the expert can enter parameters, pause an optimization, modify parameters, and explore and study the results. In all cases, the preferred embodiment of the present invention comprises an output in color graphical format. In addition, an expert preferably has the capability of retrieving numeric information from the various underlying mathematical models.

The present invention also preferably comprises a visual cognitive feedback system. Because more processing area in the brain is dedicated to visual information processing than to any other sense, there is extensive use of visual cognitive feedback. Results are preferably shown in two- and three-dimensional graphical forms with color as the fourth dimension.

E-Model

The purpose of the e-model is to allow an expert to create, manipulate, and engage in a dialogue with a computer-based rendition of his experiences. The basic premise behind the e-model is that an episode, schema, or frame can be expressed as two vectors, which in turn can be represented as relative numeric values for stimulus (cause factor) and response (effect factor) variables.

Figure 3:
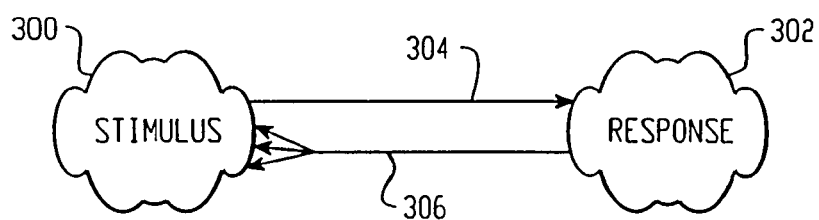
FIG. 3 is representation of a stimulus and response spaces according to the present invention.

Turning now to FIG. 3, a representation of a stimulus and response spaces according to the present invention is provided. Mathematically, the system is suitably depicted as two spaces, a stimulus space 300 and a response space 302, and stimulus vectors 304, and response vectors 306. The stimulus vectors 304 are suitably representative of a one-to-one relationship and the response vectors 306 are suitably representative of a one-to-many relationship. The dimensionality of the stimulus and response vector spaces preferably corresponds to the input and output dimensionality of the e-model. The objective is to build an injunctive mapping and an inverse mapping between the two spaces to discover functional relationships.

Neural networks are suitably used to learn such a mapping, but one must be careful to avoid over learning (memory effect). In addition, one must be sure to allow for regularization, and avoid unnecessary nonlinearities and noise. One less preferred method of building such a mapping is to train a neural network. In the presently preferred embodiment, however, patterns are first separated into clusters using a similarity measure, and then neural network models are built for each group of similar patterns. This preferred method not only identifies outliers but also results in smoother learned functions. These piece-wise functions are then preferably combined to portray the overall learned functional hyper-surface. These internal computations are suitably performed without the knowledge of the user and within acceptable response time for preparing the visual cognitive feedback for the user. The time between the user submitting his request and the system's response is suitably less than ten (10) seconds and most preferably less than five (5) seconds so that a sense of continuity is maintained.

Experts with an advanced working knowledge of computational intelligence can modify various underlying parameters to achieve desired mapping quality through an optional parameters screen. The system preferably shows the mapping phases with graphical views, including bird's eye and zoomed-in views of epoch learning errors for each mapping. The epoch learning error is preferably shown with high precision scientific notation. The system suitably permits advanced users to pause, modify factors, resume, or abort a learning session.

Figure 4:
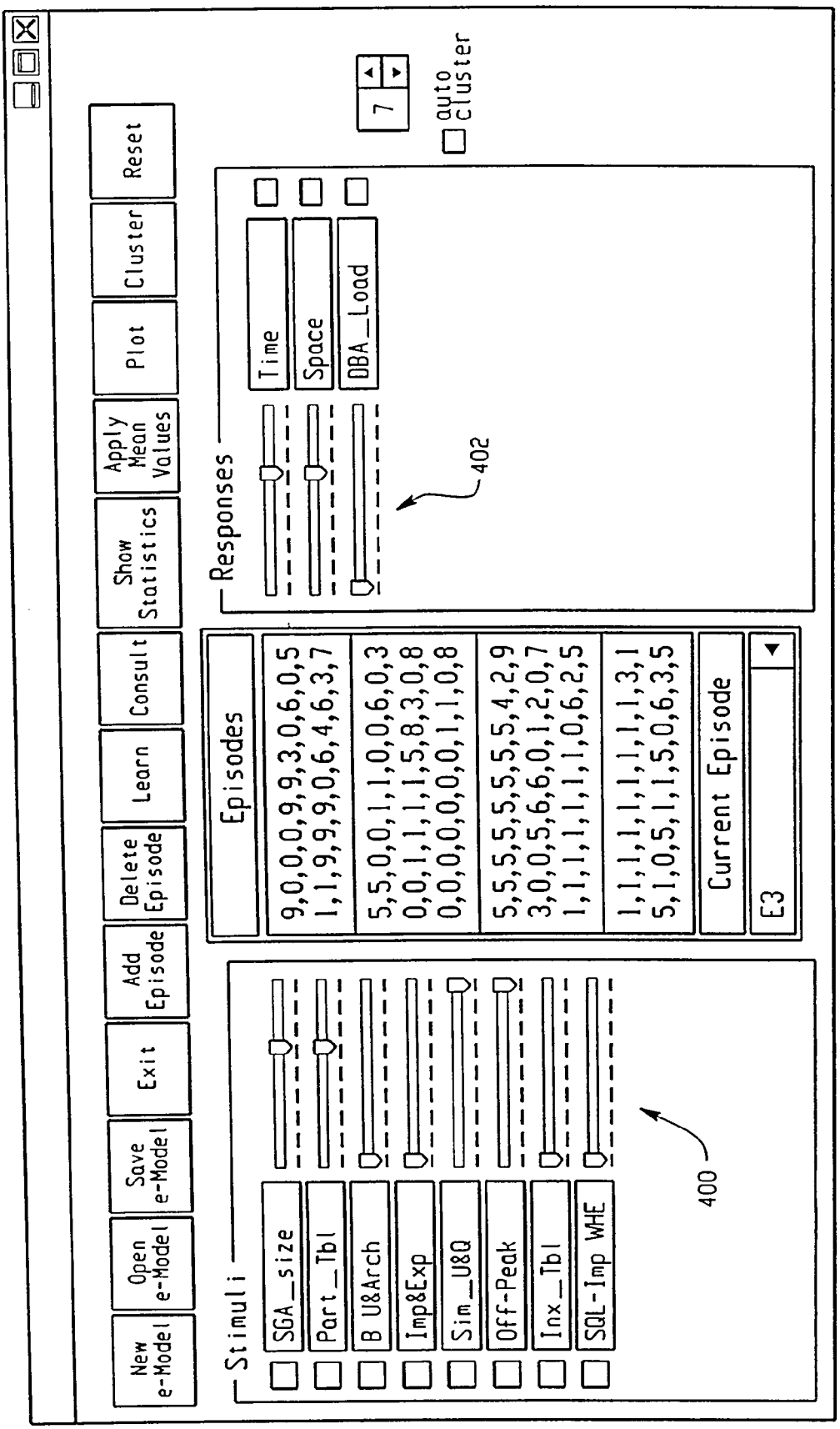
FIG. 4 is a screen shot of the e-model educer screen according to the present invention.

Turning now to FIG. 4, a screen shot of the e-model educer screen according to the present invention is provided. After an expert specifies the number of stimulus and response variables, the expert suitably utilizes the educer screen to construct a representation of an episode. For each specified stimulus, there preferably exists an input-dimensionality slider bar 400. For each specified response, there preferably exists an output dimensionality slider bar 402. The slider bars 400 and 402 are preferably pre-programmed for small and large increments. This suitably enables the expert to fine-tune an episode by implementing either fine or coarse changes. The expert suitably moves the sliders 400 and 402 to construct the representation of an episode. Through the educer screen, the expert suitably assigns labels to stimuli, responses, and episodes suitably adds, deletes, or modifies episodes. In addition, the episodes are optionally tagged with a textual description by the expert to aid in recall and recognition.

Figure 5:
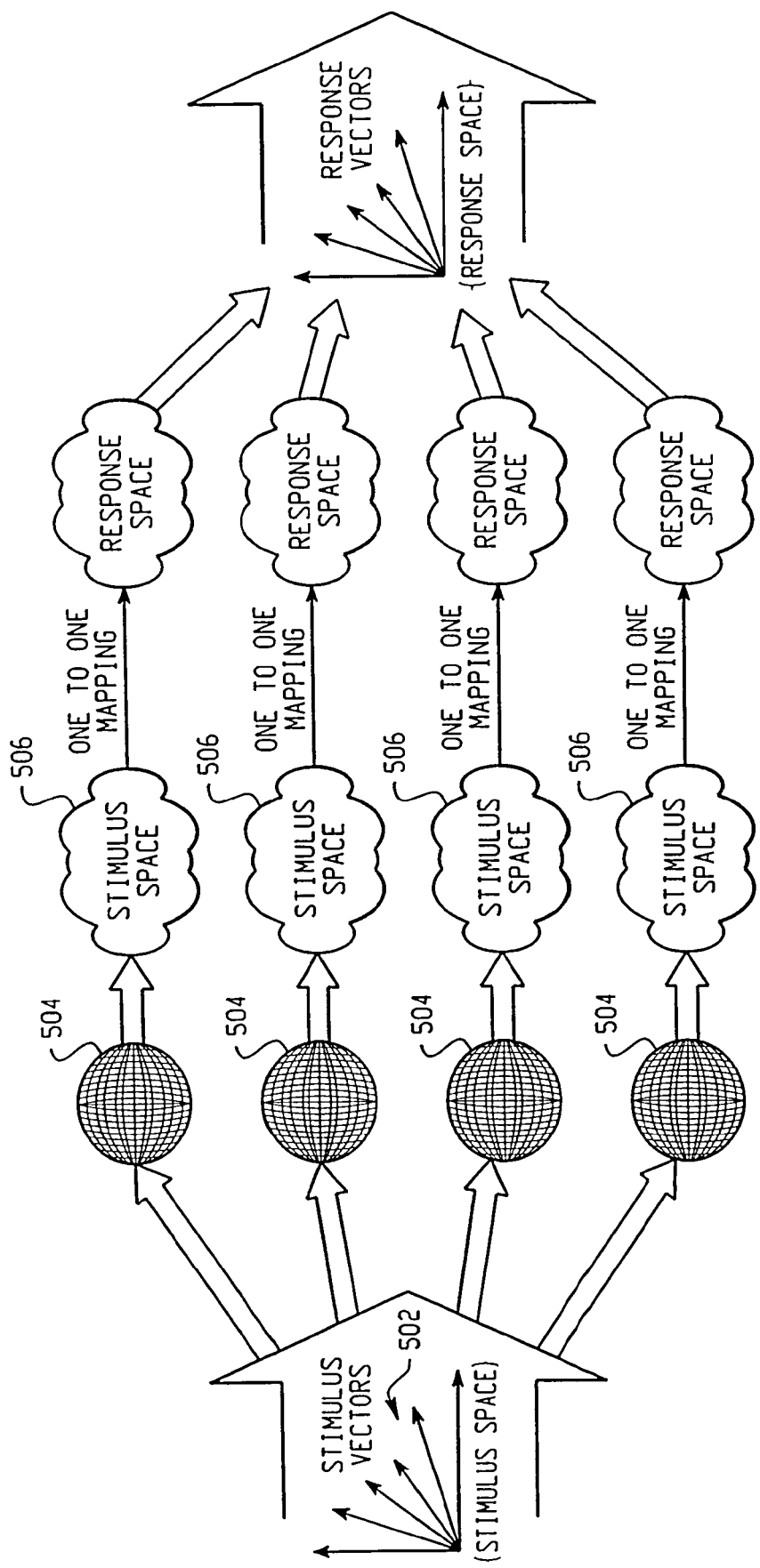
FIG. 5 is representation of the mapping and consultation process of the e-model according to the present invention.

Turning now to FIG. 5 the mapping and consultation process of the e-model is provided. The stimulus vector inputs 502 are sent through a filtering or categorization system 504. The filtering and categorization system suitably associates similar episodes in the form of clusters while flagging any outliers. The system preferably identifies and groups episodes that are similar to each other using Minkowski metric. The filtering and categorization is suitably accomplished through the utilization of statistical and autonomous parallel processing systems. Each cluster from a hierarchy of clusters built during categorization suitably feeds a neural net system 506 comprising a stimulus space and a response space. It should be noted that each neural net system 506 suitably comprises more than one neural network and is not limited to a single stimulus space or a single response space. A nonlinear injunctive mapping is preferably learnt between stimuli and responses. For each neural net mapping, the system preferably tests a plurality of mapping techniques and chooses to utilize those mappings that provide a balance between regularization, under-fitting, and excessive nonlinearity. The system preferably automatically solves for the constrained multi-criteria optimization problem each model.

The model building process suitably comprises many steps that are preferably hidden from the user. The results of consulting the mapping are synthesized and are presented to the user as visual cognitive feedback. After the mapping process is successfully completed the expert can move through the original episodes. As he moves through each episode, the values for stimulus and response sliders are preferably automatically set to the values of that particular episode.

The system also preferably performs inverse mapping, which is the mapping from response space to stimulus space, in order to seek out optimum stimulus values for desired response values. Inverse mapping aids in optimization and goal seeking functionality. As shown in FIG. 3, one-to-many mappings are possible when mapping from response space to stimulus space. Therefore, different combinations of stimuli can produce identical responses. Simple inverse mapping causes neural networks to learn the average of all the stimuli and associate that average with the response. If different stimuli have different relative weights then the system suitably associates a weighted average with the response.

Rather than implementing simple inverse mapping techniques, the present invention preferably implements an outside optimization loop. In the presently preferred embodiment, a direct optimization technique is utilized. A direct optimization technique is one that evaluates the value of an objective function at various points in a solution space, rather than using information form gradients, conjugate gradients, and the like. Therefore, when using a direct optimization technique, information conjugate gradients and the like is not available. The optimization algorithm thus becomes more important when conducting efficient searches. The presently preferred embodiment employs two optimization techniques, each of which includes measures for accommodating constraints, costs, and relative desirabilities of the goals specified by the user. The two optimization techniques are modified forms of an evolutionary programming technique and a flexible tolerance or amoeba method.

Ideally, one of the goals of the system is to reduce the number of evaluations of an objective or merit function, while achieving relatively quick evaluation times. Therefore, heuristics are employed. One method that is suitably used to accomplish this goal is to continually learn about the surface of the solution space during the searching process. A short-term memory is suitably built during optimization for a particular problem. This short-term memory is preferably adaptive and capable of improving itself for use with similar problems. As more searches are conducted, without many changes in the parameters, this memory preferably begins to aid in the location of the global optimum and helps avoid getting trapped in local optima. It also helps in selection of progressively better starting points as searches continue. Using this configuration, the objective function is evaluated repeatedly and the search continually progresses toward better solutions.

At any given time, a list of the best solutions obtained thus far is preferably maintained. This is to ensure that if the search is terminated, or if it wanders off in a wrong direction, or if it takes a long time, or if the user is not satisfied with the optimum solution, the user will still have a list of some potentially viable options. The search suitably continues until a pre-specified number of iterations is reached, a pre-specified amount of time is elapsed, or a solution is found within a pre-specified tolerance of the goals, weights, and constraints desired by the user. At all times during the optimization, the user suitably has the capability to pause a search, modify parameters or his goals, restart the search, or stop the search.

The present invention also preferably provides functionality that permits a user to recall past episodes from a repository of episodes, by supplying weighted, partial, distorted, or full cues. A search conducted on a partial cue suitably reduces the dimensionality of the space to that of the partial cue whereas a search based on a full cue suitably locates the closest matches in Minkowski space. The user can thus perform a search to favor dimensions that are weighted higher or lower. In addition, the present invention preferably permits a user to search for a past situation that is similar to a present situation.

The expert can consult the e-model by setting the slider bars on the stimuli side to desired values and asking the e-model to provide the results by consulting the model. Internally it is a two-stage process of consulting the groups and then the associated mapping. The values of the responses are obtained through interpolation. A well-behaved model is one that allows generalizations while minimizing noise, high non-linearities, and memory effect.

In addition to setting the sliders, the results of consultation also appear on the same graphic display as the results of consultation from the s-model. This makes it possible to readily compare and contrast the results from the two different modeling approaches, or espoused theories with theories-in-use.

The e-model also preferably allows the user to perform grouping, categorization, or clustering of stimuli, responses, and episodes. The user can graphically instruct the system to use a selected similarity measure. In Euclidean distance terminology, a cluster would be a circle in two-dimensions, a sphere in three-dimensions, and hyper-sphere in higher dimensions. Clustering is suitably repeated until either no factors (stimului and responses) switch clusters or the number of factors switching clusters is small, or the changing of clusters follows a pattern.

Figure 6:
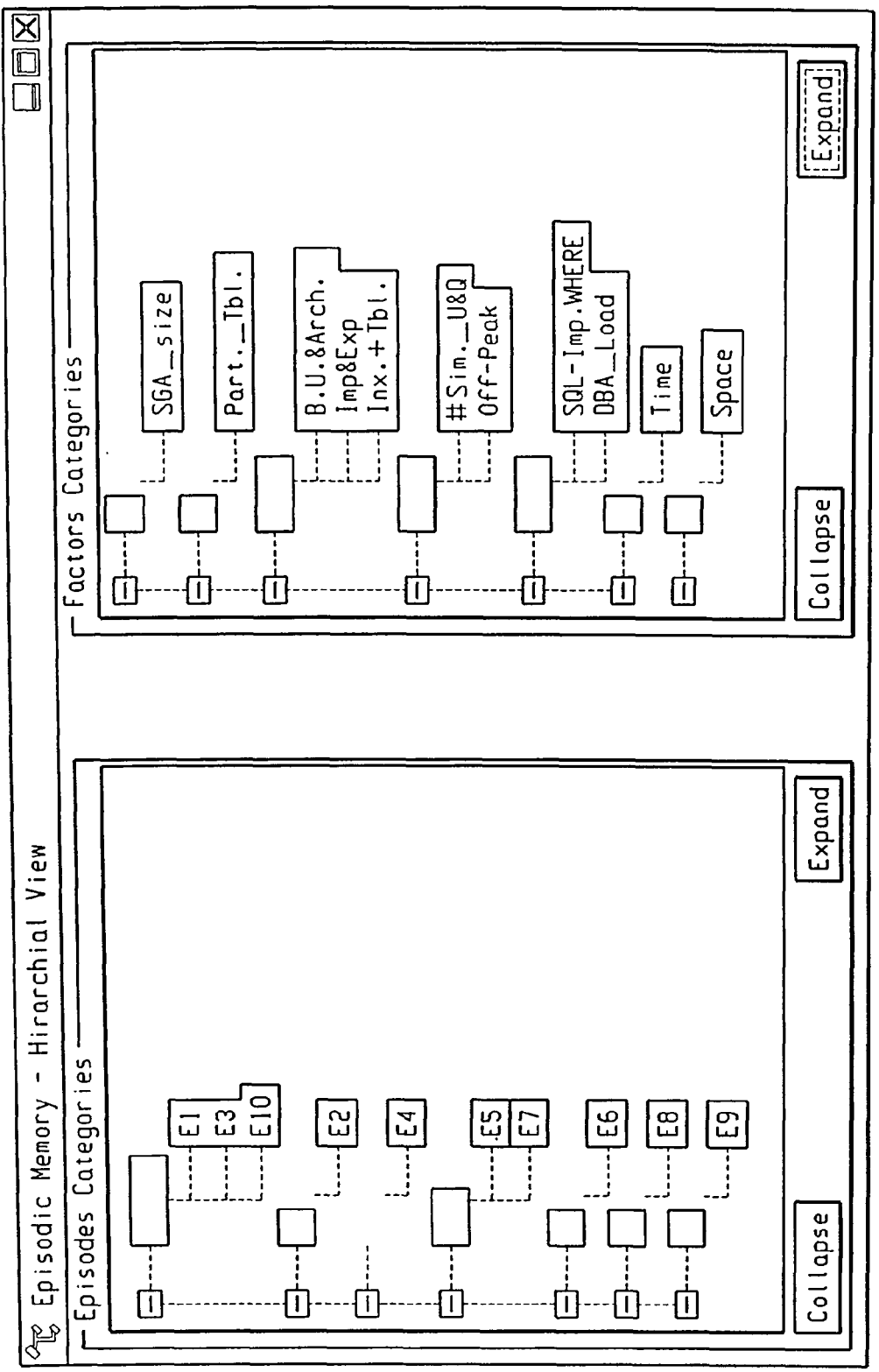
FIG. 6 is a dendogram representing the results of categorization of episodes and factors according to the present invention.

Turning now to FIG. 6, a dendogram representing the results of categorization of episodes and factors is provided. The results of clustering are preferably presented in color such that similar factors are represented by identical colors. The dendrograms preferably represent the overall hierarchical structure of categories and subcategories showing where various factors fit. The dimensionality of the categorization space is preferably equal to the number of stimulus and response variables in the case of episodes, and equal to the number of episodes in the case of stimulus and response categorization.

The user can also view the trends learned or discovered during the mapping phase by selecting a stimulus or stimuli and plotting a selected response as a function of the selected stimulus or stimuli. When a user selects a single stimulus, the system preferably generates a two-dimensional line plot of the type illustrated in FIG. 7. Preferably, the line plot is depicted in color. The curvature, slope, and direction of the plot show trends. In addition, the system calculates an approximate slope and presents it to the user to compare it with a relationship value between the corresponding cause and effect variables of the type provided by the user in the s-model. A plot is suitably generated by holding all values constant except the selected stimulus, and varying the independent variables at regular intervals as specified by the user. A higher number of steps or intervals provides fine or high-resolution plots. In order to generate the plot, the system suitably consults the e-model a number of times equal to the number of intervals.

Figure 8:
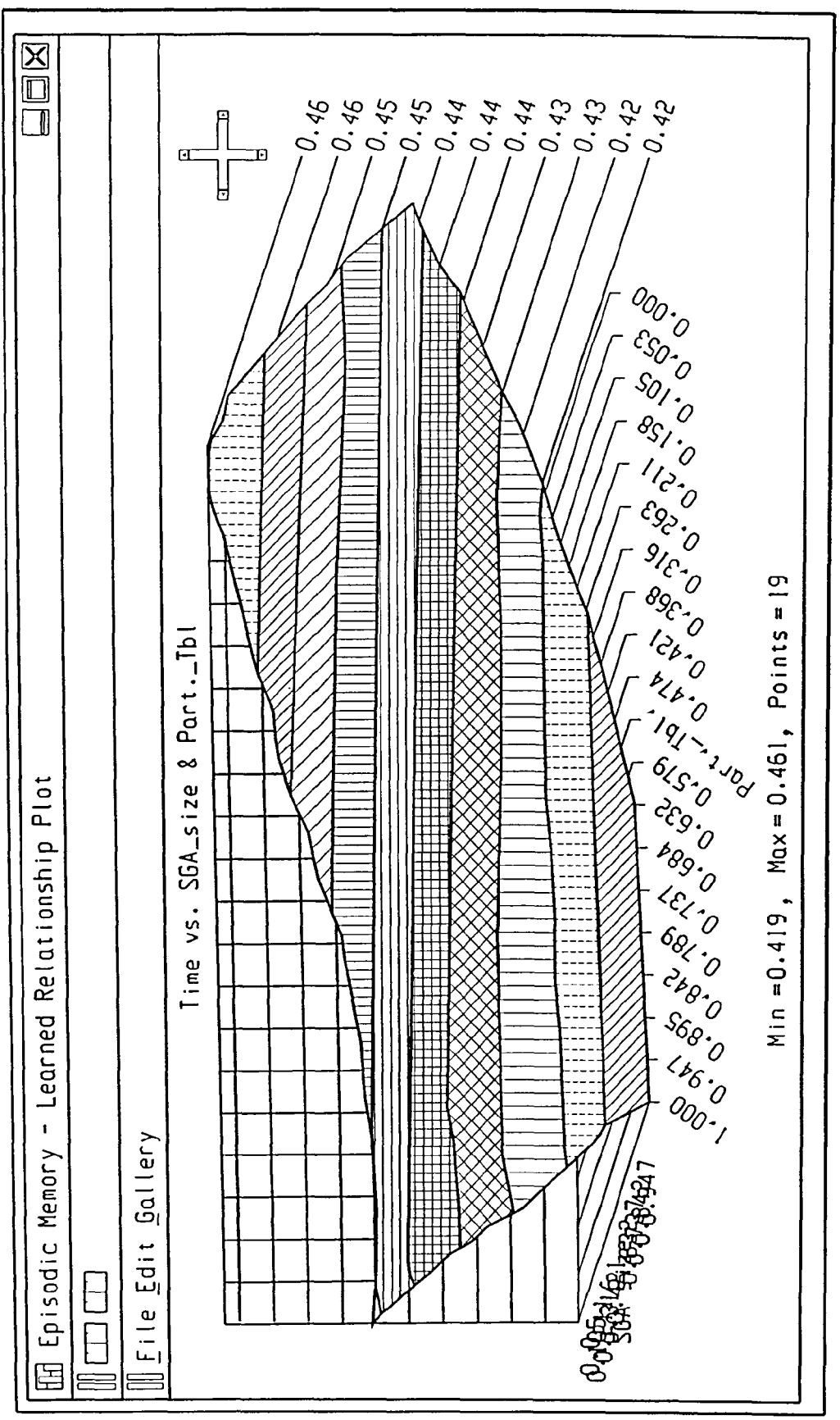
FIG. 8 is a screen shot of a three-dimensional surface plot of the type generated by the e-model upon selection of multiple stimuli.

When a user selects a plurality of stimuli, the system preferably generates a three-dimensional surface plot of the type illustrated in FIG. 8. The three-dimensional surface plot is preferably color-coded to provide a better view and understanding of the variables height that depicts the dependent variable. The expert suitably selects the number of steps for which the system should generate values for plotting. A plot is suitably generated by holding all values constant except the selected stimuli, and varying the independent variables at regular intervals as specified by the user. A higher number of steps or intervals provides fine or high-resolution plots. In order to generate the plot, the system suitably consults the e-model a number of times equal to number of intervals squared. In the presently preferred embodiment, the user can rotate the plots around all three axes, change perspective, tilt, and zoom in and out. These features facilitate the detection of minor hidden anomalies in an otherwise apparently well-behaved relationship trend.

Figure 7:
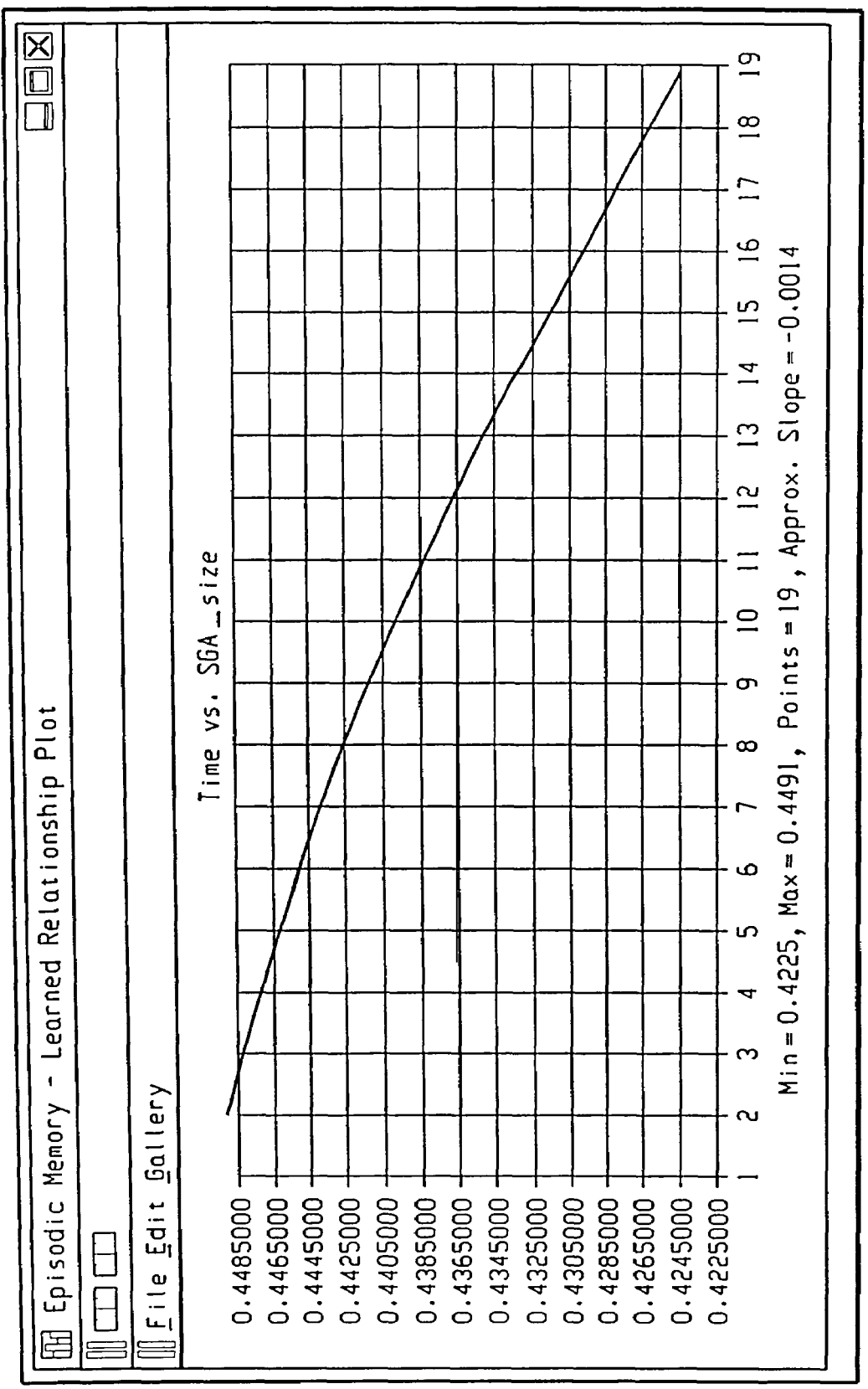
FIG. 7 is a screen shot of a two-dimensional plot of the type generated by the e-model upon selection of a single stimulus.
Figure 10:
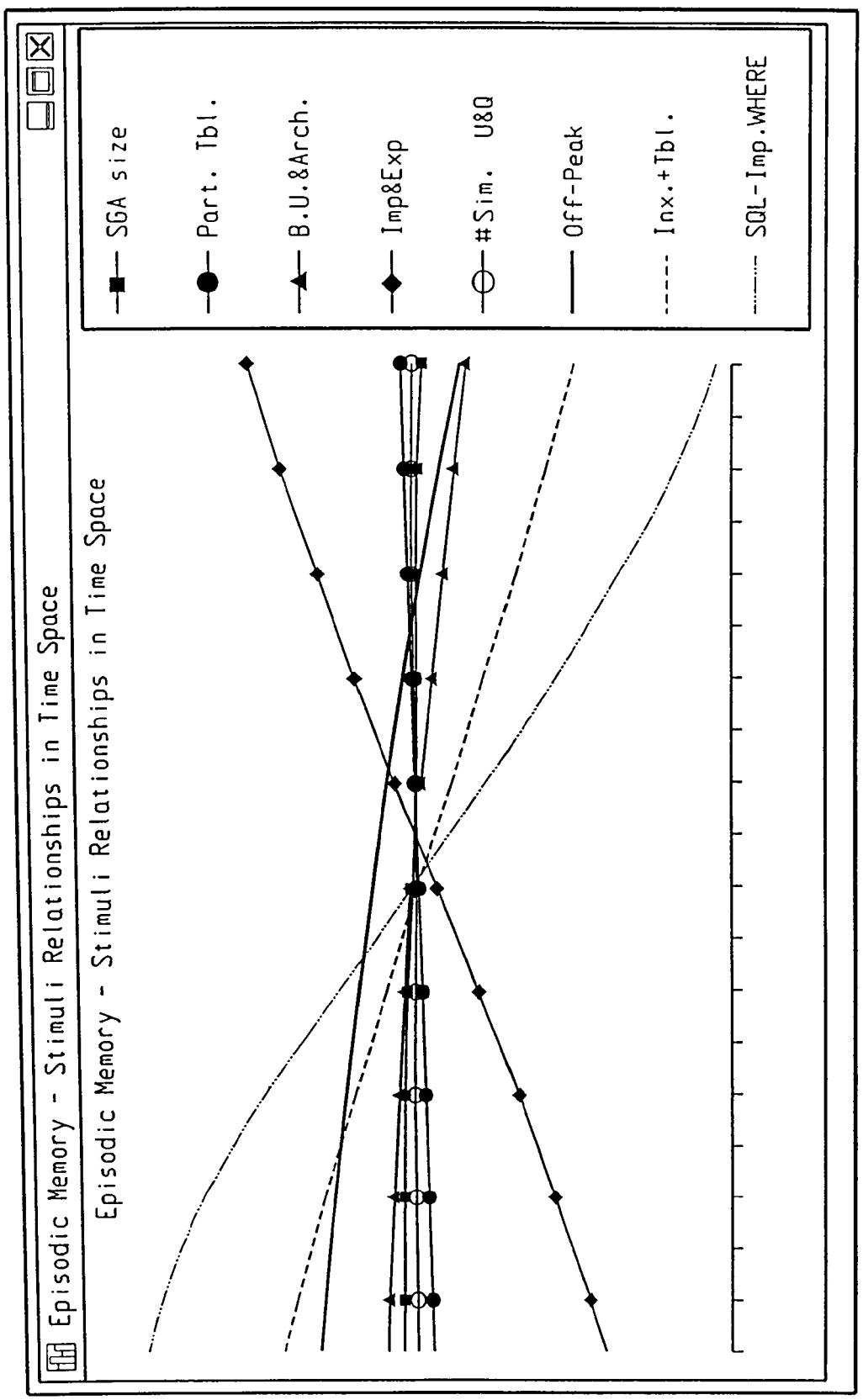
FIG. 10 illustrates a graph showing the relationship of all stimuli to a single response factor, when all other response factors were held at their mean values.
Figure 11:
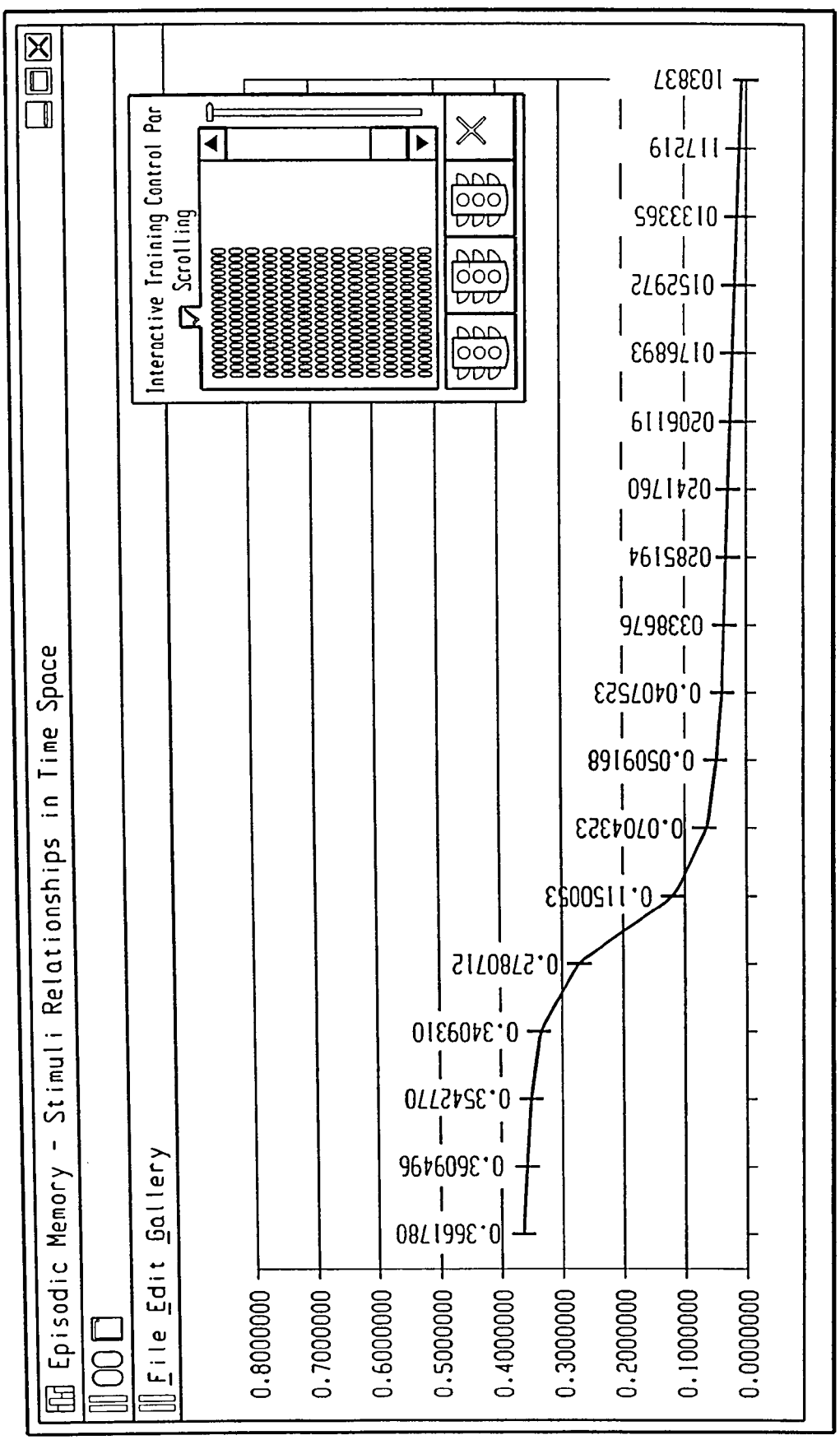
FIG. 11 illustrates a control console screen for learning the mapping in the e-model.

In addition to the dendogram and discovered relationship plots of FIGS. 6-8, the preferred embodiment of the present invention generates additional output shown in FIGS. 9-11.

FIG. 9 illustrates an output screen showing general statistics.

FIG. 10 illustrates a graph showing the relationship of all stimuli to a single response factor, when all other response factors were held at their mean values.

FIG. 11 illustrates a control console screen for learning the mapping in the e-model.

Figure 12A:
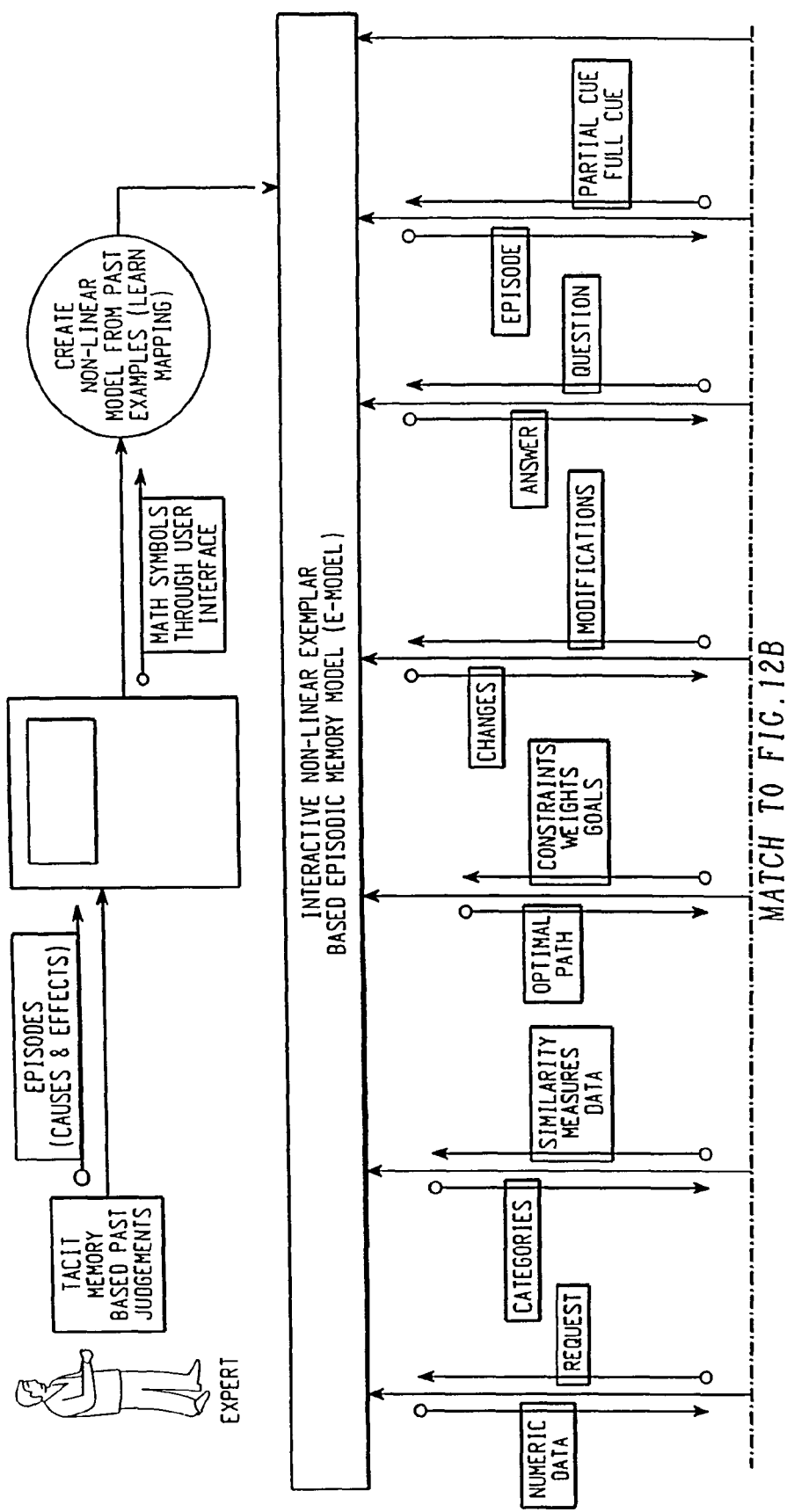
FIG. 12 illustrates the overall design of the e-model according to a presently preferred embodiment.
Figure 12B:
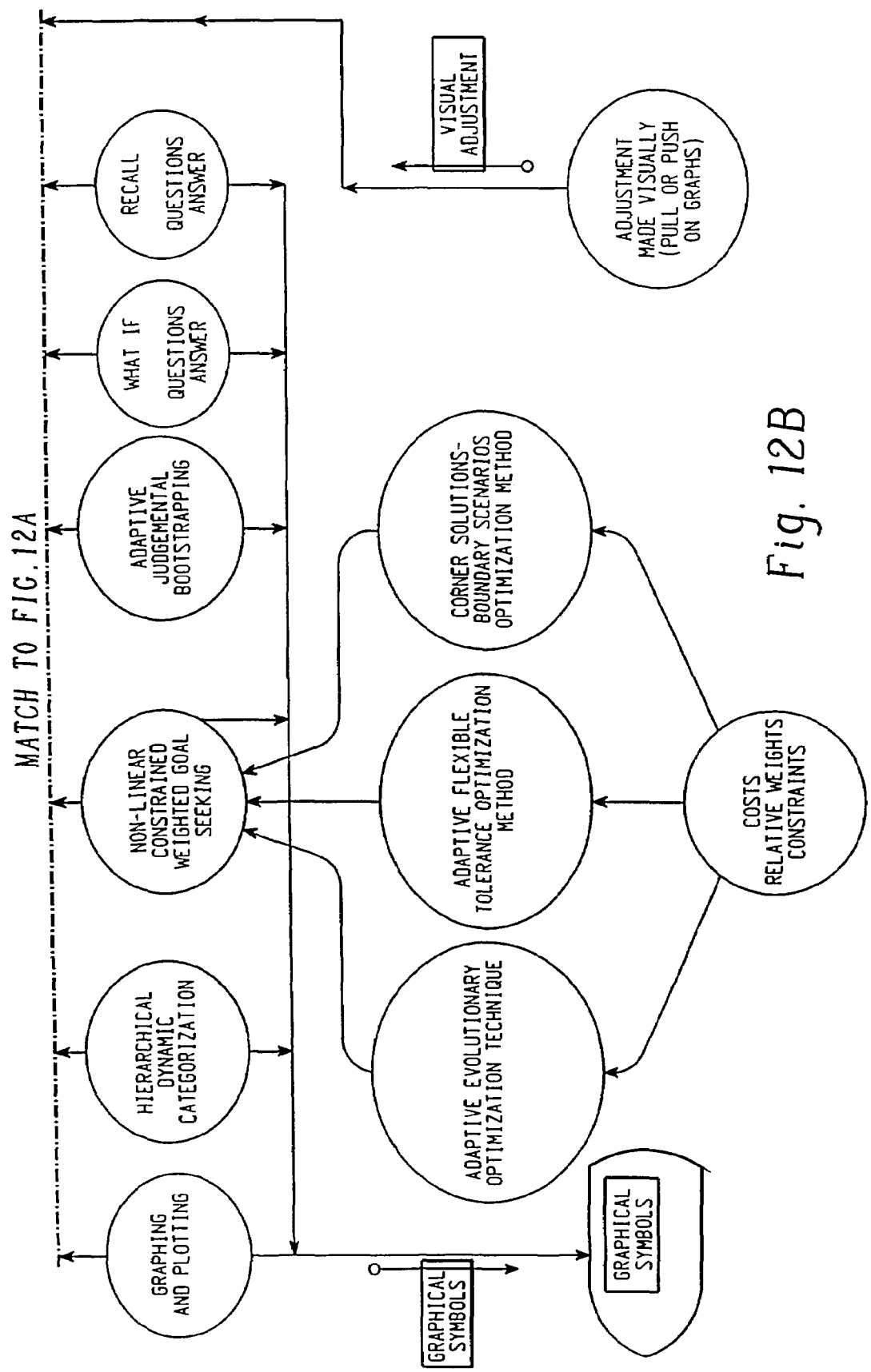

FIG. 12 illustrates the overall design of the e-model according to a presently preferred embodiment.

Figure 13:
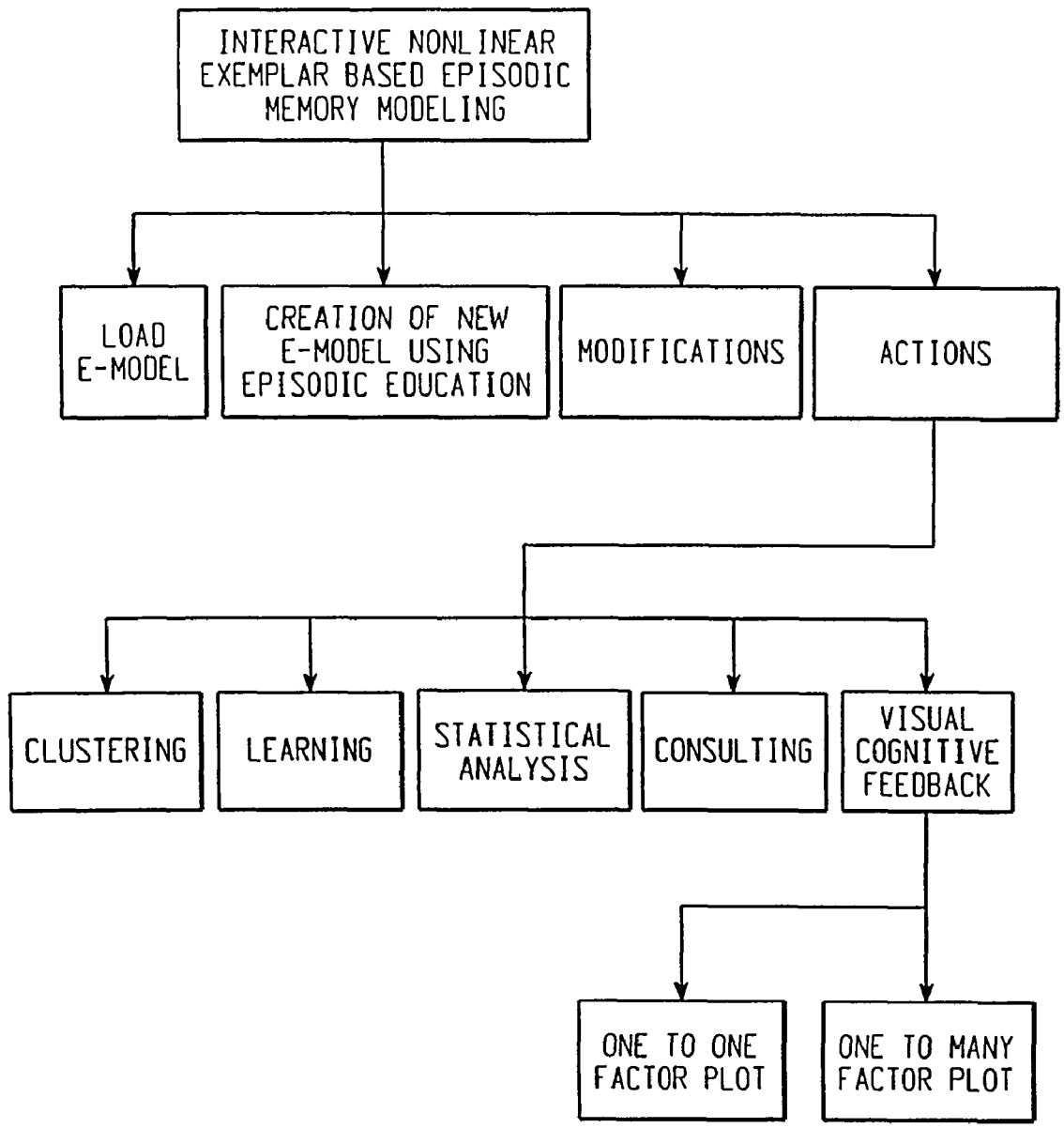
FIG. 13 is a high level diagram illustrating some of the functionality of the e-model.

FIG. 13 is a high level diagram illustrating some of the functionality of the e-model.

S-Model

The purpose of the s-model is to allow an expert to create, manipulate, and engage in a dialogue with a computer-based rendition of the factual relationships that he is capable of articulating. The s-model is based on the premise that it is possible to elicit piece-wise linear functional relationships between pairs of causes and effects, or antecedents and consequents, from an expert in order to construct a reasonably plausible faceted decision-surface by joining the individual lines. The input dimensionality of the model thus formed equals the number of causes and the output dimensionality is equal to the number of effects. The presently preferred embodiment implements the s-model using a parallel distributed processing architecture.

The concepts of the basic elements of this technique are similar to that of judgmental bootstrapping. However, bootstrapping is a static technique whereas the s-model is part of a dynamic and adaptive environment that is controlled by the expert. The s-model is a tangible model that is suitably queried, whose elements can be categorized, and whose factors can be weighted against each other. It suitably provides visual cognitive feedback to the user, allows for changing of the model by moving a few graphical artifacts, and provides functionality for performing constrained, weighted, goal seeking.

Figure 14A:
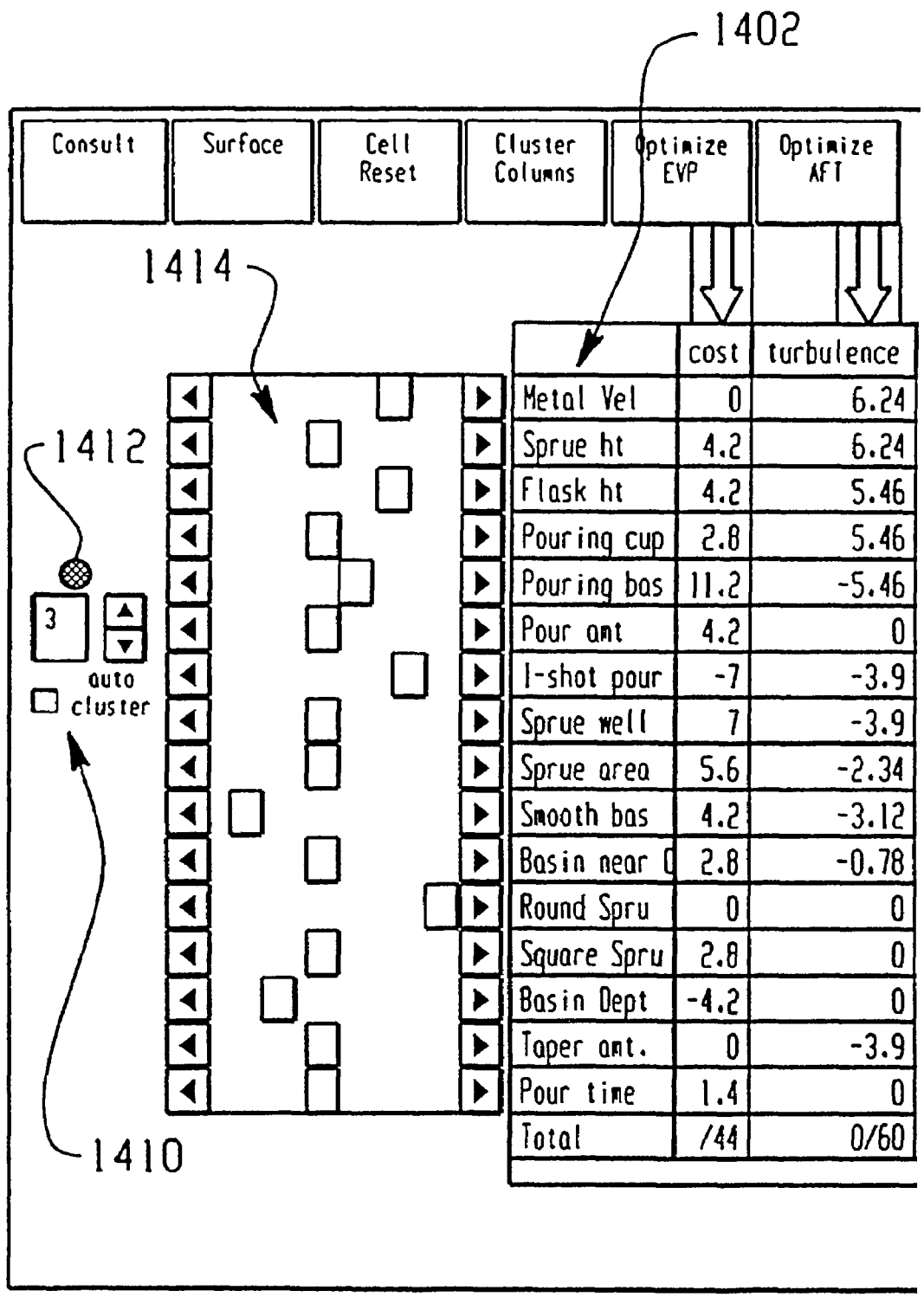
FIGS. 14A, 14B, and 14C show a screenshot illustrating a main control panel for s-modeling, clustering, ranking, goal seeking, and visualization according to the present invention.
Figure 14B:
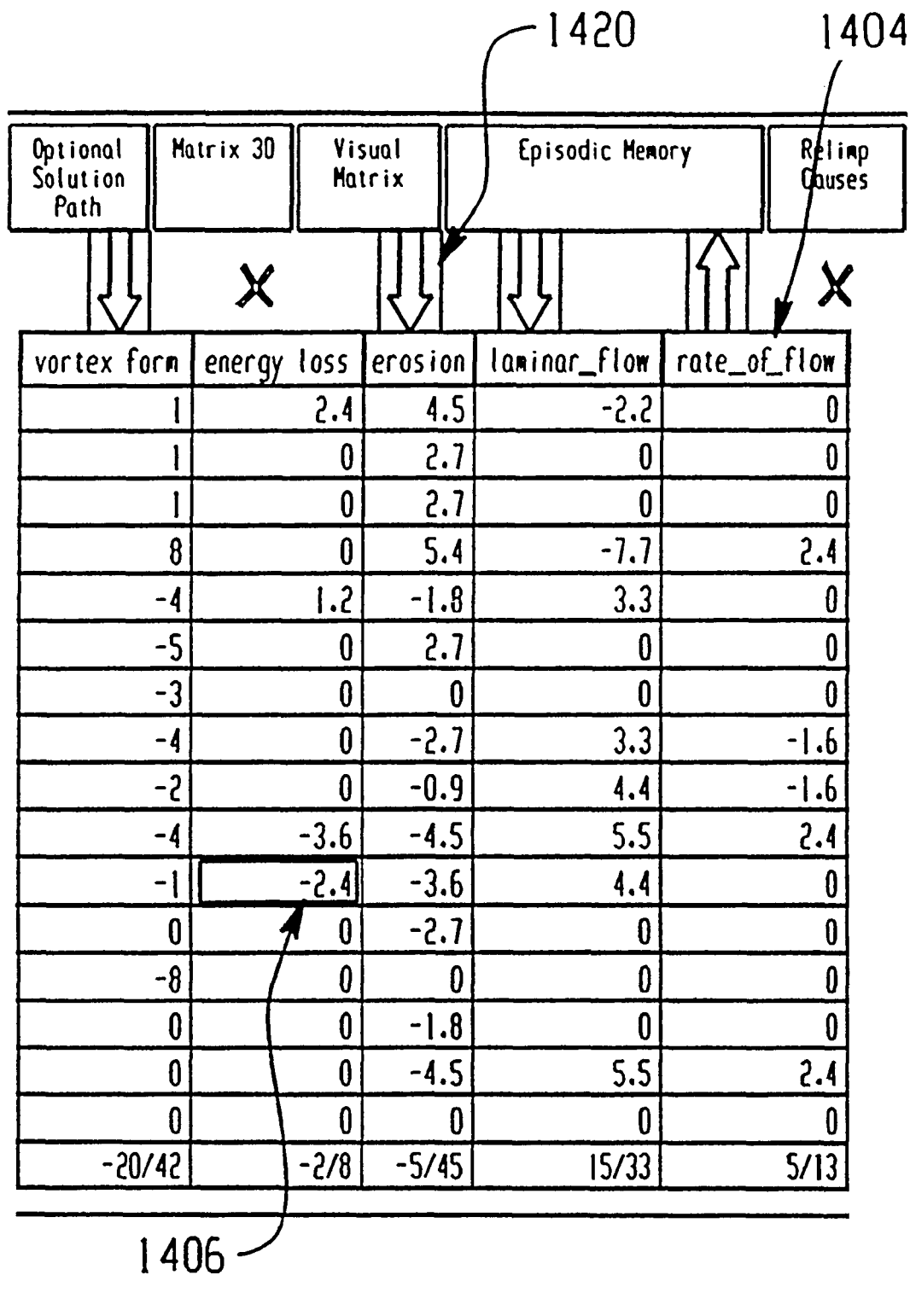
Figure 14C:
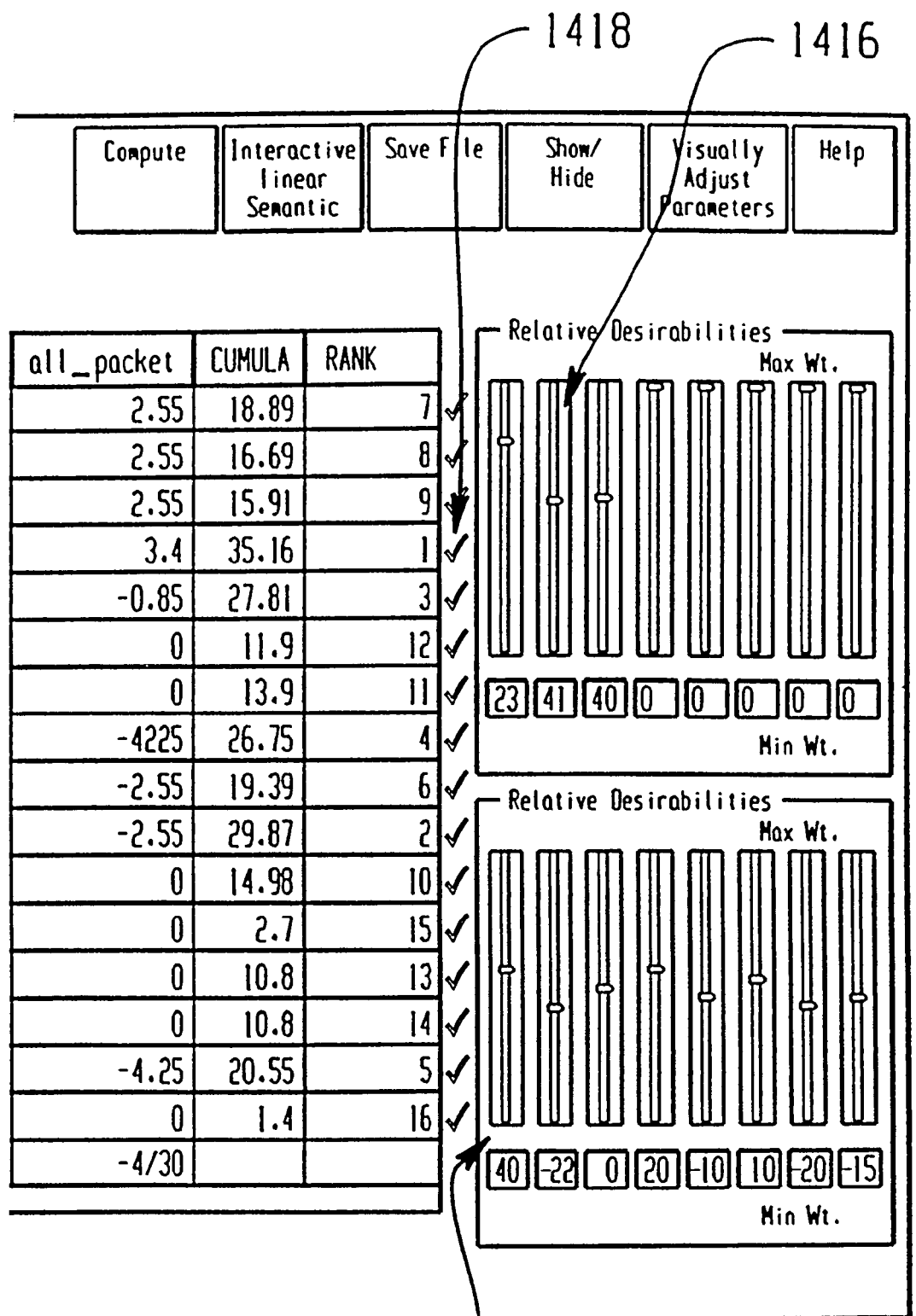

In order to more clearly explain the functionality of the s-model, the following vocabulary will be used:

I The total number of causes;
J The total number of effects;
i The $i^{th}$ cause;
j the $j^{th}$ effect;
$w_{ij}$ Judgment-based value of the relationship between the $i^{th}$ cause and the $j^{th}$ effect wherein the value is assigned a real number between −10 and +10, the positive or negative sign corresponding to positive or negative effect respectively and the number representing the strength of the relationship;
$x_i$ Value of the cue for the $i^{th}$ cause presented by the user to the system for consulting;
$r_i$ Relative importance of the $i^{th}$ cause with respect to the rest of the I−1 causes, wherein the default is preferably set to $r_i=1/I$, where all causes have equal importance;
$b_j$ Expert user's bias or predilection towards or against an effect, wherein it is a measure of relative importance of the $j^{th}$ effect, as viewed by the expert, in the model;
$o_j$ Model's output value of the $j^{th}$ effect which is the result produced by the model after consulting with a set of causes, x;
$f_{ij}$ Expert's faith in the relationship between the $i^{th}$ cause and $j^{th}$ effect wherein the relationship is specified by $w_{ij}$;
$d_j$ Desired value of the $j^{th}$ effect, wherein the result produced by the model after consulting with a set of causes, x, is $o_j$, and wherein the user indicates that he prefers the value $d_j$ instead of $o_j$ and would like the model to adapt to reflect this change in his viewpoint;
$D_j$ The difference between the desired value and the model's output for the $j^{th}$ effect, $D_j=(d_j-o_j)$;
$\tau$ Similarity measure, or tolerance, a scalar used for classification, wherein its value is directly proportional to the degree of desired similarity;

Turning now to FIGS. 14A, 14B, and 14C, a screenshot illustrating a main control panel for s-modeling, consulting, clustering, ranking, goal seeking, and visualization is provided. To initiate the s-modeling process, a user suitably enters a plurality of names of the causes (cause factors) 1402 or inputs for the model as row labels and a plurality of names of effects (effect factors) 1404 or outputs of the model as column labels. An empty matrix is created thereby created. Each cell of the matrix corresponds to a judgment-based qualitative relationship between a cause factor and an effect factor.

For each cell, a user enters a number, $w_{ij}$, between −10 and +10 to indicate the strength and direction of the relationship. In other words, the cell value, $w_{ij}$, 1406 represents the influence that the corresponding cause has on the corresponding effect. Optionally, the user also enters for each cell a number, $f_{ij}$, between 0 and +10 to indicate the expert's faith in his judgment about the relationship. The system default is suitably equal faith for all relationships. Also optionally, the to user suitably indicates a value, $r_i$, for a cause or a plurality of causes, its importance relative to the other causes. The user suitably selects $r_i$ values through the use of slider bars 1408. The system default is suitably equal importance for all causes. Furthermore, for each column or effect, a user optionally indicates his bias or predilection toward or against the effect by indicating a value, $b_j$. The system default is suitably no bias. If there is any special case resulting from atypical conjunctions of certain causes, the user can add an appropriate row label for the case.

Once the s-model is built, a user can validate the model. To validate the model, the user suitably presents a set of values for causes, consults the model, and observes the results produced by the model. If the resulting effects produced by the model are not satisfactory, the user suitably makes adjustments to the previously entered values. If the results after modification are satisfactory, the validation is complete.

The s-model preferably permits users to change values of up to five parameters and view the resulting clusters. It can aid the user in exploring different options and scenarios. It also provides an understanding of similarities among causes and effects from various viewpoints.

The system preferably automatically classifies causes on the basis of similarity. A user suitably selects a similarity measure 1410. The presently preferred embodiment color codes the cause factors 1402 such that similar factors 1402 are shown in the same color. Similarly, the presently preferred embodiment color codes the effect factors 1404 such that similar factors 1404 are shown in the same color. In addition, color dendrograms of the type shown in FIG. 6 show hierarchical clustering of causes and effects. Whenever a change is made to a judgment value, faith value, the relative importance of the causes, or to the biases towards the effects, the system preferably automatically performs reclassification. Immediate visual feedback is provided to the user through changing colors, and new trees, to signify similarities among causes and similarities among effects.

The expert can also increase or decrease the similarity measure 1410 or tolerance, τ. Preferably, this is accomplished either visually through a spin button or by typing a numeric value. The tolerance is suitably graphically shown as a growing or shrinking filled circle 1412. Immediate reclassification and the resulting color feedback takes place whenever the similarity measure 1410 is modified. Low and high tolerance values suitably correspond to fine and coarse grains of classification respectively.

The user can consult the model for what-if analysis by presenting different values 1406. A user can provide qualitative information about causes on continua that range from nothing to extremely high. Alternatively, the user can also enter crisp numbers. The system visually displays the corresponding effects after consulting the model.

In addition, during goal seeking, a user can move goal seeking sliders 1414 to desired values of causes and consult the results of the model. Also, goal seeking operations suitably set the slider bars 1414 to their appropriate positions. Furthermore, a user can select relative desirabilities 1416 during goal seeking or select which causes will be manipulated during goal seeking 1418. Goals for causes 1420 during goal seeking are also suitably set to either increase, decrease, or don't care.

When a set of causes $x_i$, i=1, . . . , I is presented to the s-model for consultation, the outputs $o_j$, j=1, . . . , J are suitably calculated as follows:

$$o_j = \gamma_j(net_j, b_j)$$

$$net_j = \Sigma_i w_{ij} x_i r_i f_{ij}$$

$$\gamma_j = net_j b_j$$

$$o_j = (\Sigma_i w_{ij} x_i r_i f_{ij}) b_j$$

If the user does not agree with the results of consultation, he can modify the value of the effect in question, the modification suitably being a graphical modification, by using the ACFM. He can instruct the model that he believes the response from the model ought to be higher or lower. Such a situation may arise if the user's mental model has evolved or changed due to some reason, or if he thinks that the aggregate outputs are not a correct representation of his mental model. Before any changes are made to the model the user suitably has the opportunity to assign a confidence level, $c_j$, to his new position. The system preferably automatically adapts to the user's new position by readjusting its internal parameters.

Figure 15:
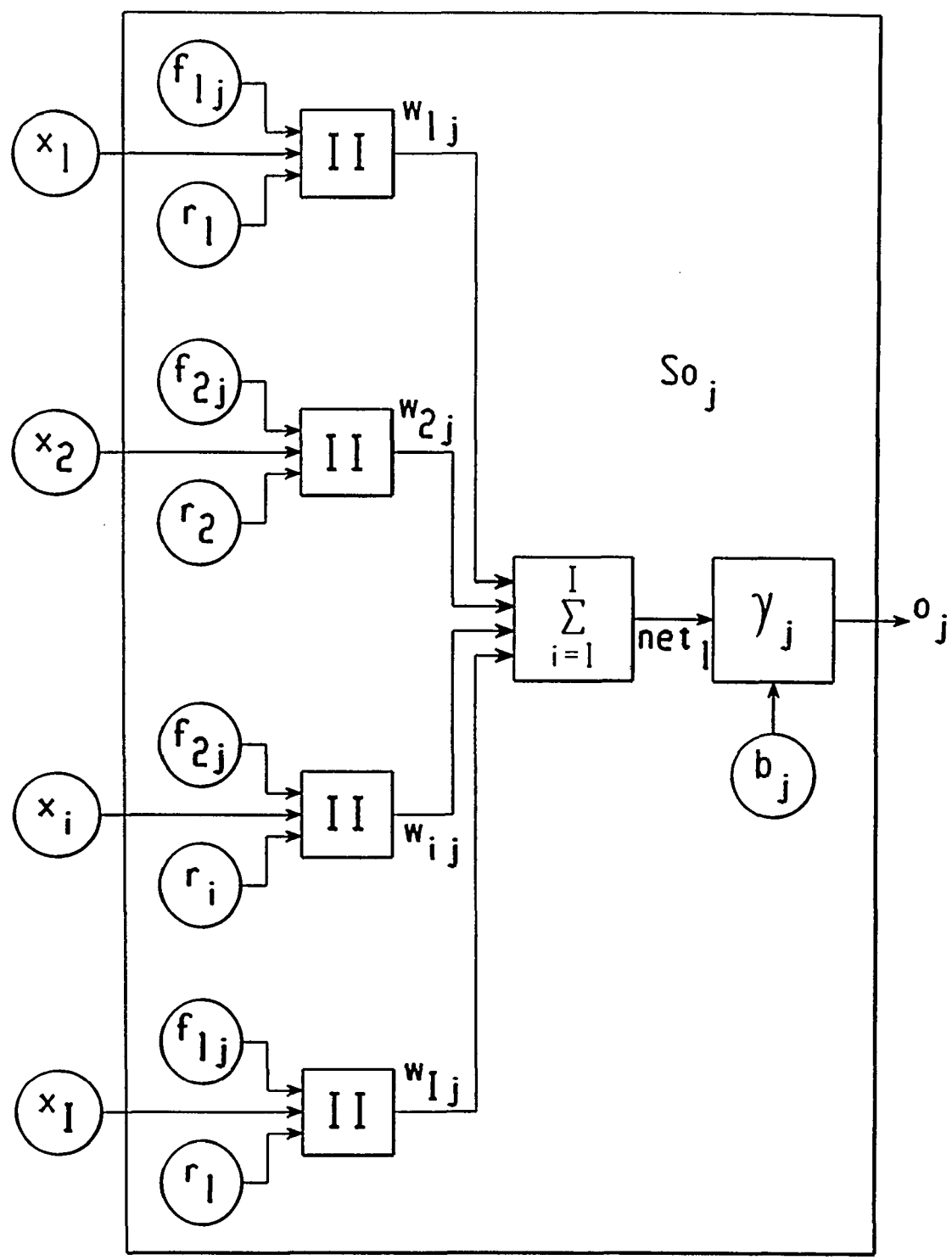
FIG. 15 is a connectionist representation of the architecture for computing a $j^{th}$ effect for computation of the s-model according to the present invention.

Turning now to FIG. 15, a connectionist representation of the architecture for computing the $j^{th}$ effect is provided. For the entire s-model with I causes and J effect, J nets will suitably exist in parallel. When a user wants to modify the model he supplies the desired value $d_j$ corresponding to the $j^{th}$ effect. The difference $D_j$ between the desired value and the computed value $o_j$ forms the basis for changes to the judgment values $\Delta w_{ij}$ of the model. The user preferably has an option of specifying his confidence $c_j$ in the proposed modification. The relative importance $r_i$ of the I causes is also considered. The change in judgment $\Delta w_{ij}$ is preferably computed as follows:

$$\Delta w_{ij} = D_j r_i c_j, i=1, \ldots, I$$

$$\Delta w_{ij} = (d_j - o_j) r_i c_j.$$

The new judgment value at time t+1 is calculated as follows:

$$w_{ij}(t+1) = w_{ij}(t) + \Delta w_{ij}$$

Where:

$W_{ij}$ (t+1) is the new judgment based value for the relationship and $w_{ij}$ (t) is the current judgment based value for the relationship.

Figure 16:
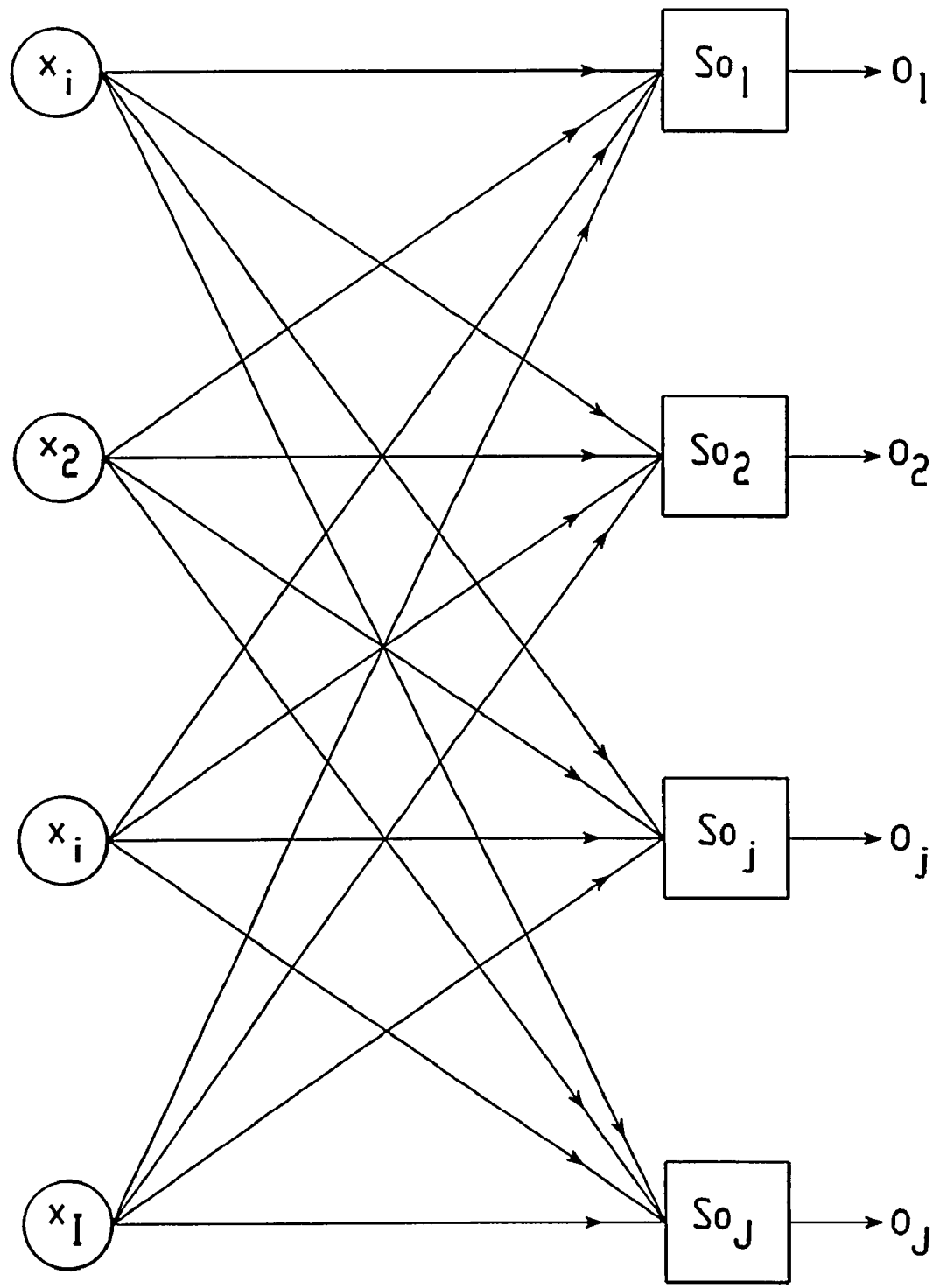
FIG. 16 is a simplified connectionist representation of FIG. 15.

Turning now to FIG. 16, a simplified connectionist schematic illustration of the model of FIG. 15 is provided.

Once the s-model is built, the model and data contained therein is manipulable and viewable just as is the e-model. That is, all the functions described in the design of the e-model, such as optimization, relative weightings, and graphing, etc., are also available in the s-model.

Figure 17:
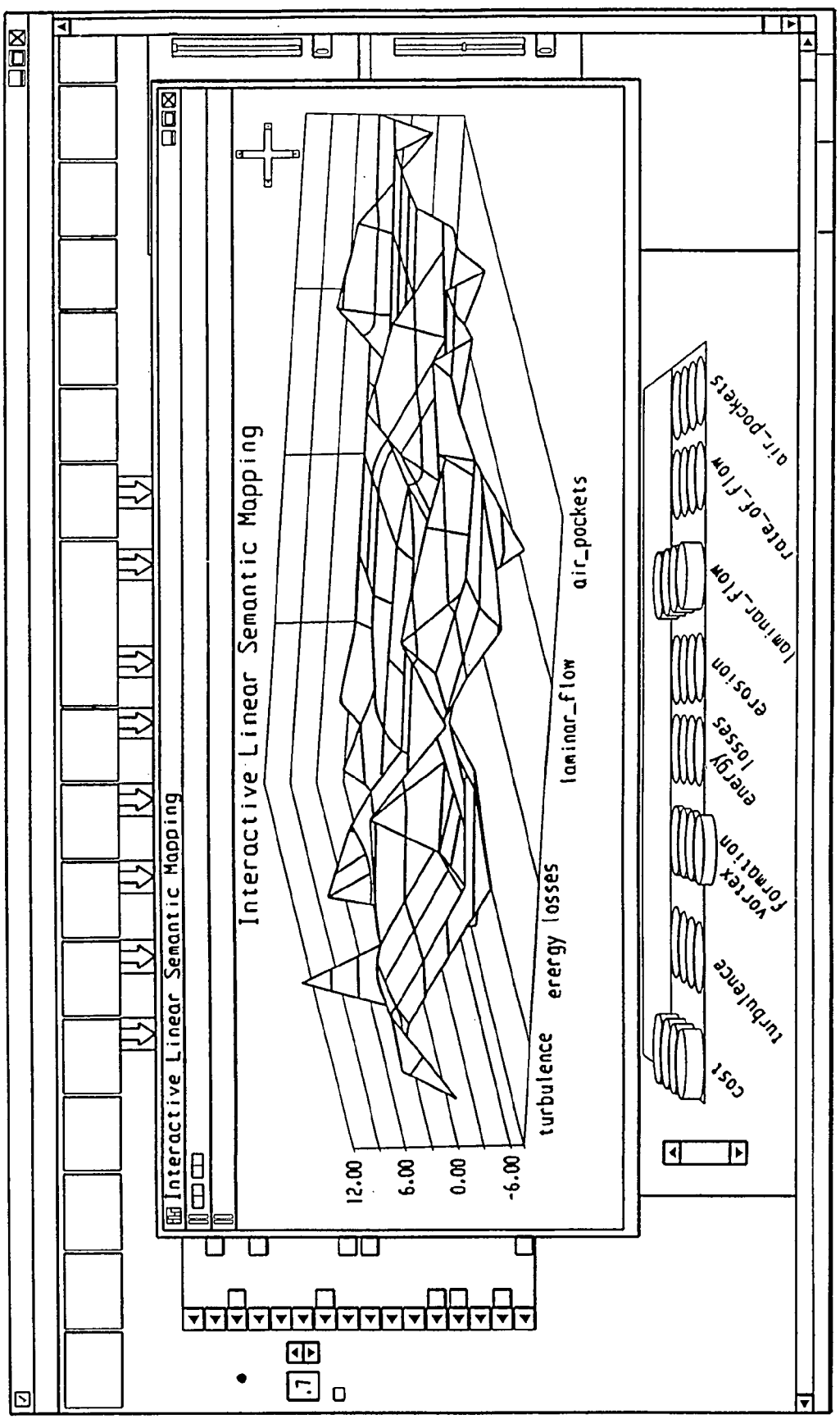
FIG. 17 is a screen shot illustrating consultation results and a faceted decision hyper-plane surface of the s-model of the present invention.
Figure 18:
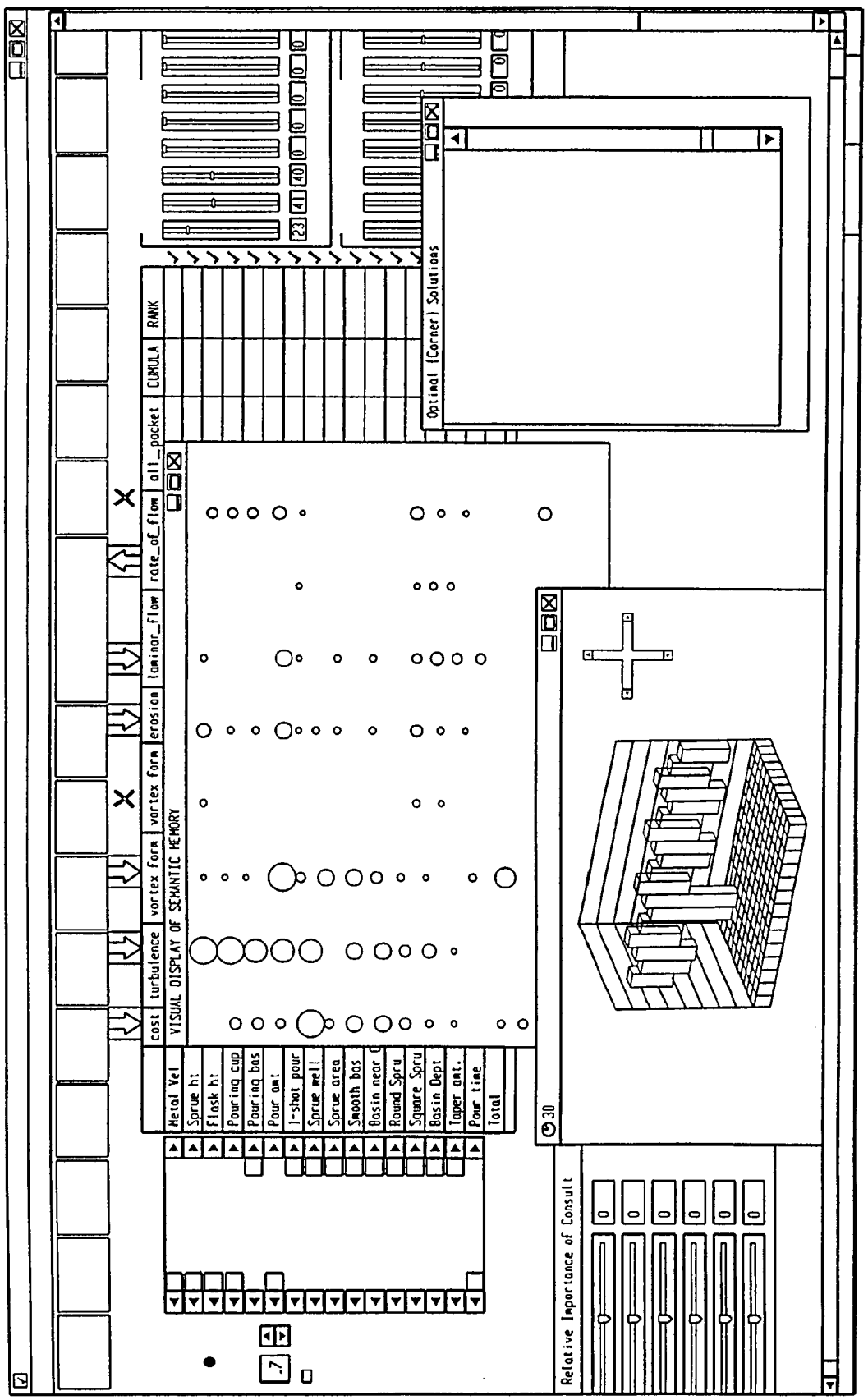
FIG. 18 screen shot illustrating two different manipulable graphical views of the relationships and the results of corner solutions optimization.
Figure 19:
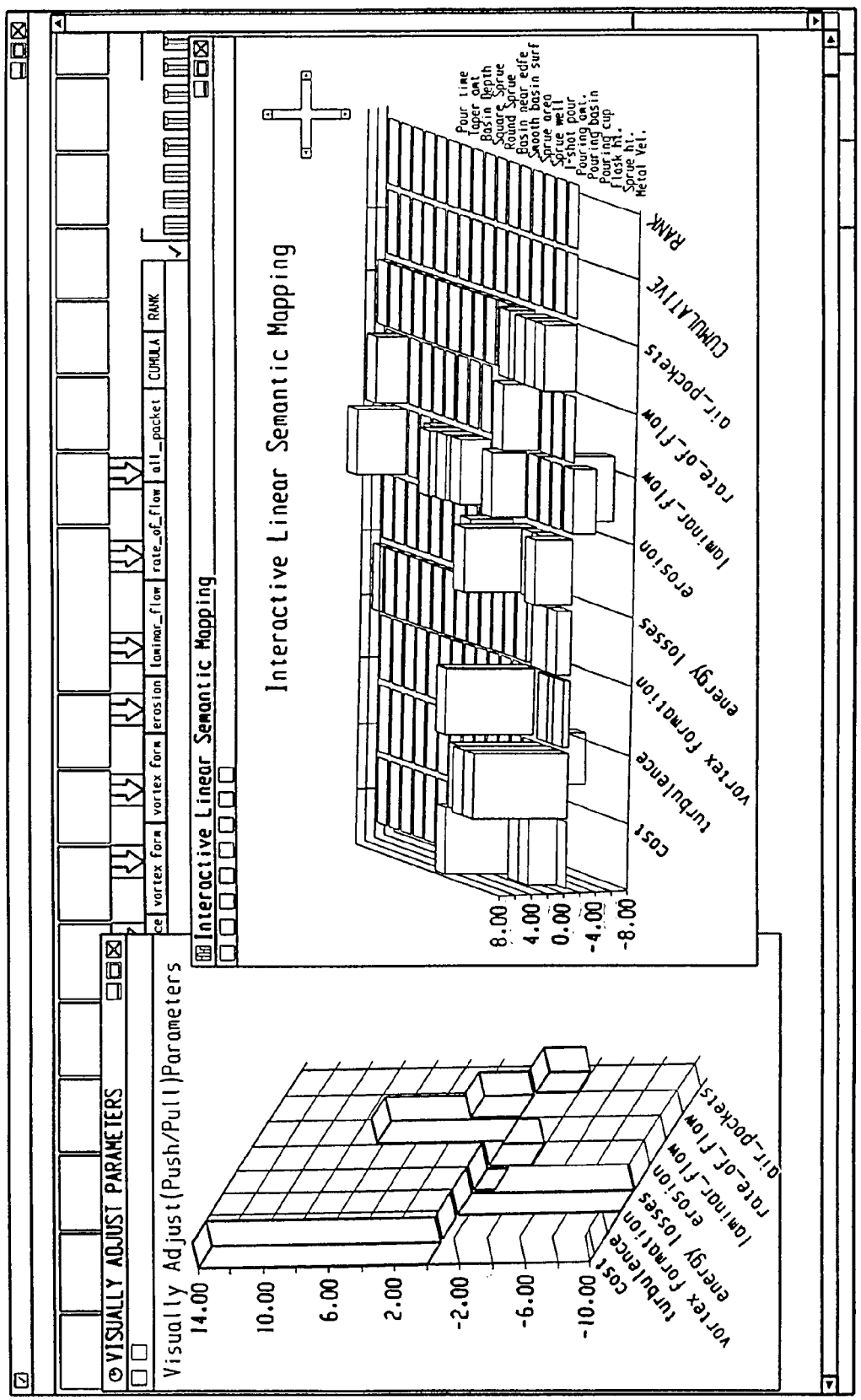
FIG. 19 is a screen shot illustrating an interactive graphical display of the relationships and the adaptive conjoint feedback mechanism for cybernetic control or teaching the system graphically by pushing and pulling on the graph.

FIG. 17 is a screen showing consultation results and faceted decision hyper-plane surface of s-model FIG. 18 screen showing two different manipulable graphical views of the relationships and the results of corner solutions optimization FIG. 19 is a screen showing an interactive graphical display of the relationships and the adaptive conjoint feedback mechanism for cybernetic control or teaching the system graphically by pushing and pulling on the graph.

Figure 20:
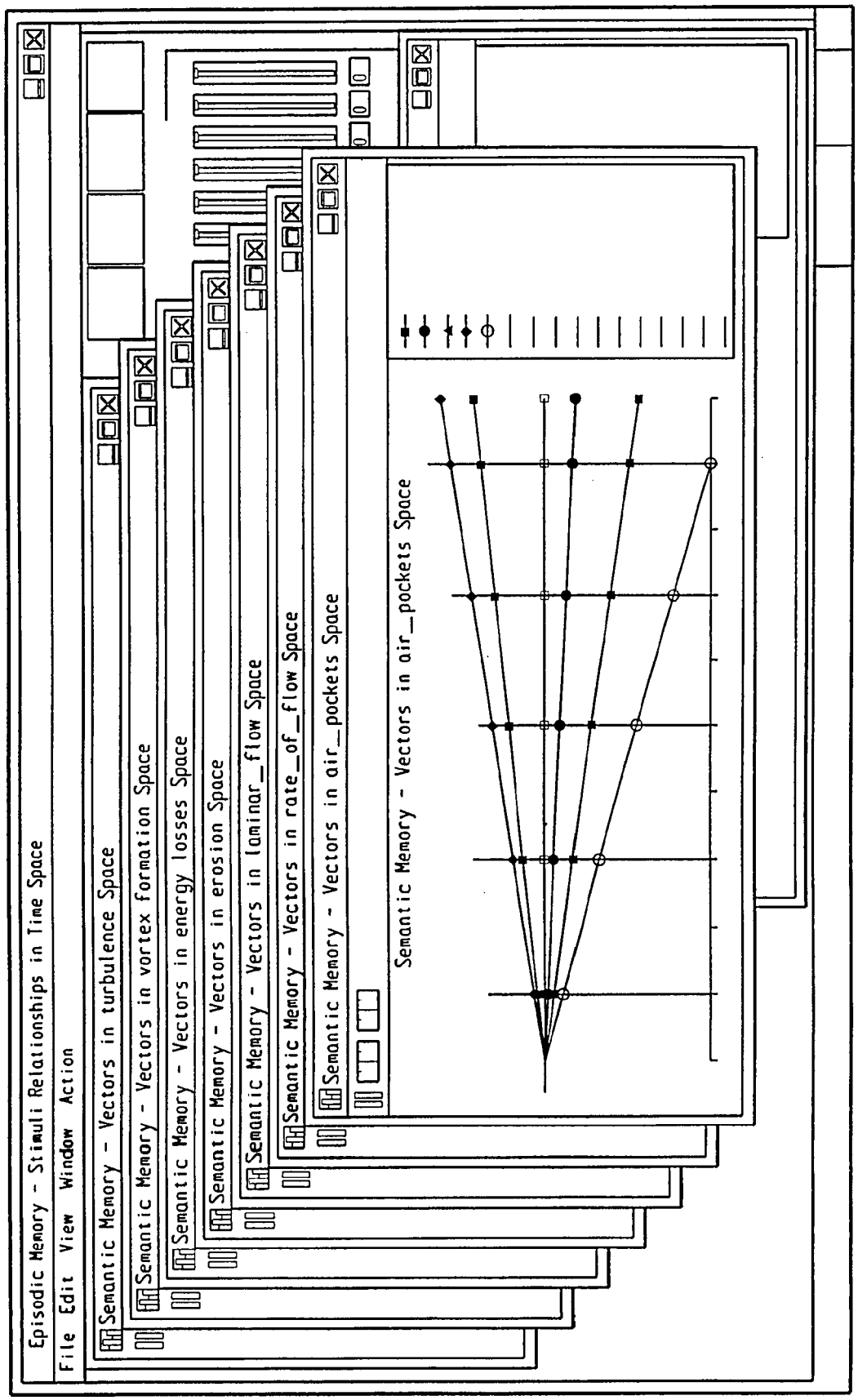
FIG. 20 is a screen shot illustrating cascaded windows where each window shows relationship vectors for all causes in one effect's space.

FIG. 20 is a screen showing cascaded windows where each window shows relationship vectors for all causes in one effect's space.

Figure 21A:
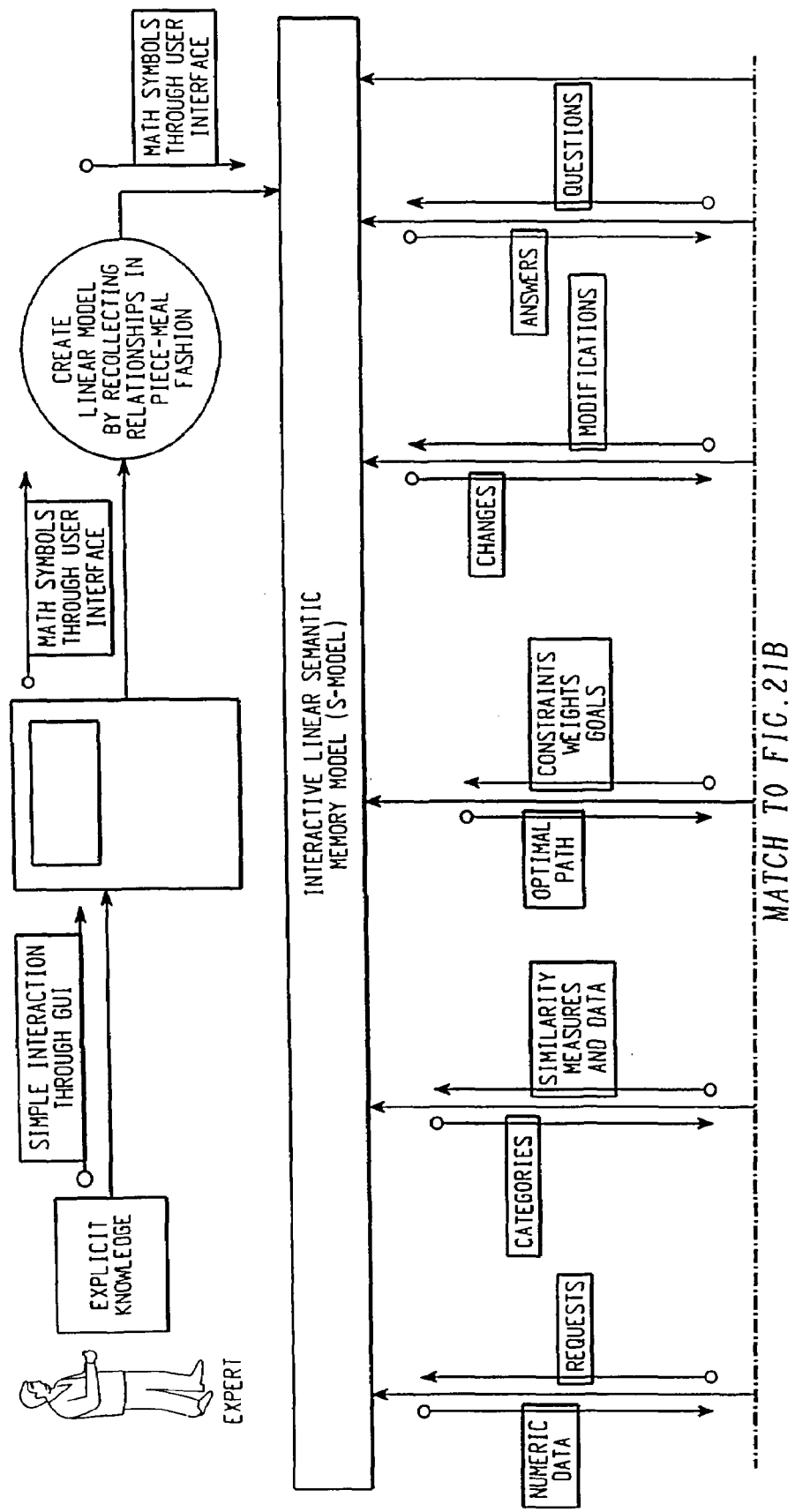
FIG. 21 illustrates the overall design of the s-model according to a presently preferred embodiment.
Figure 21B:
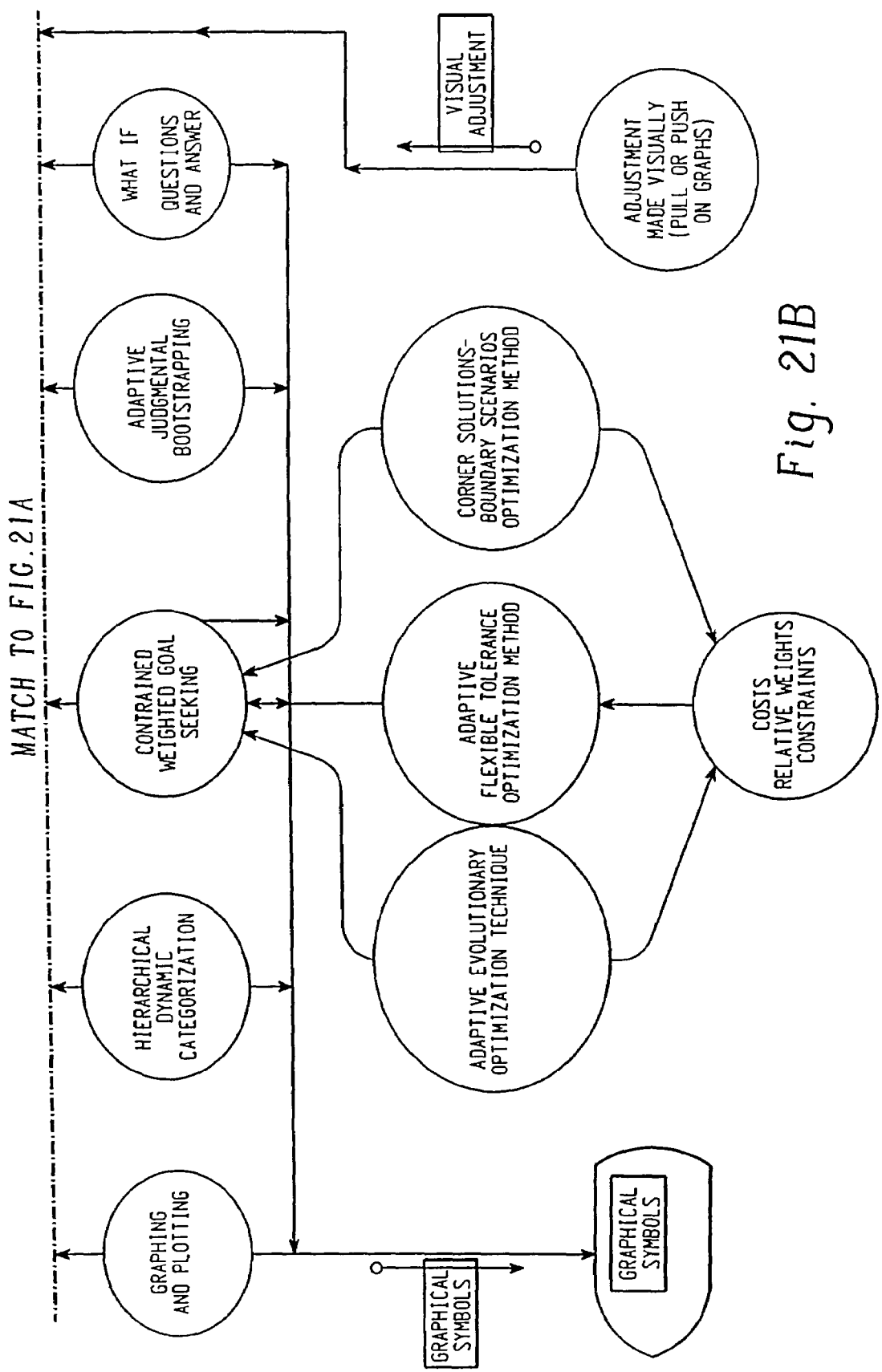

FIG. 21 illustrates the overall design of the s-model according to a presently preferred embodiment.

Figure 22:
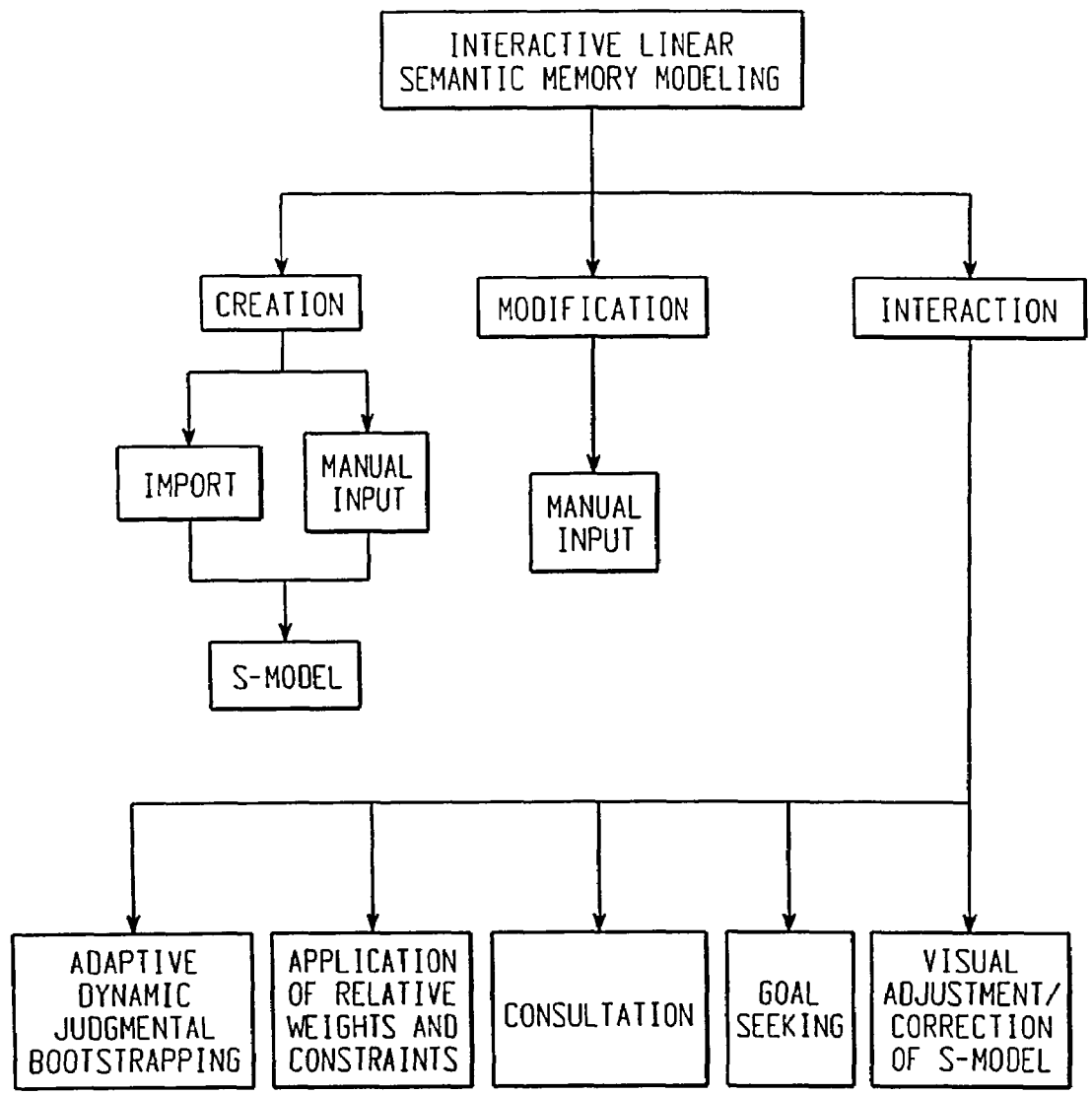
FIG. 22 is a high level diagram illustrating some of the functionality of the s-model.

FIG. 22 is a high level diagram illustrating some of the functionality of the s-model.

The present invention is suitably configured for use on a stand-alone system, or in a network environment, whether peer-to-peer, client-server, or N-tier, and is suitably configurable to accommodate a plurality of users, all of whom contribute to either a single mental model or a plurality of mental models. In this manner, the present invention is suitably capable of describing a mental model on an organizational level. In other words, the present invention is suitably configurable to create an organizational memory.

Figure 23:
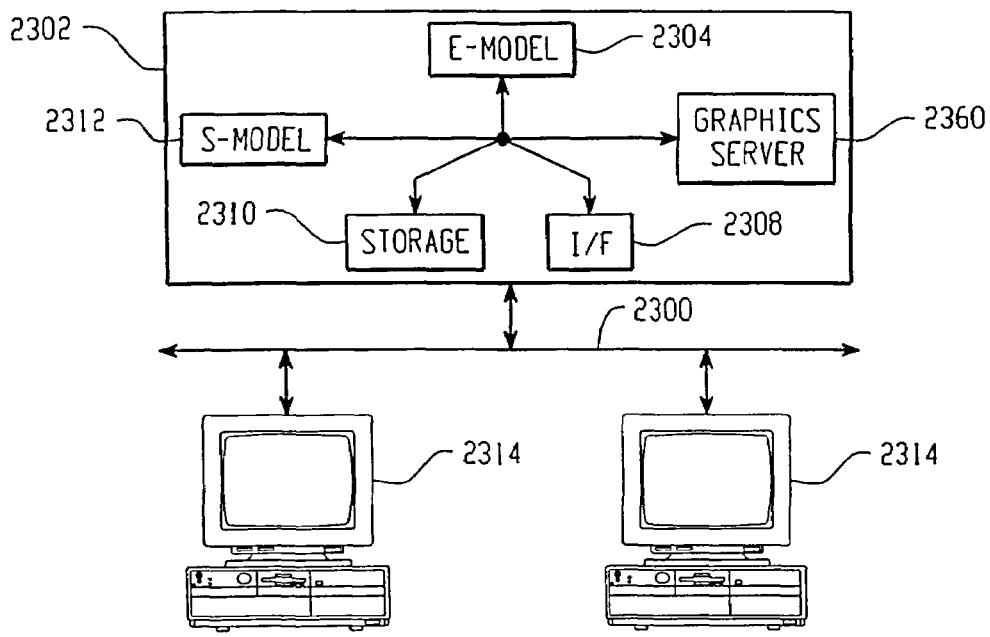
FIG. 23 is a system diagram of the present invention in a network environment.

Turning now to FIG. 23, there is provided a system diagram of the present invention in a network environment. The system comprises a data transport network 2300 illustrative of a LAN or WAN environment in which a preferred embodiment is provided, such as a packet-switched TCP/IP-based global communication network. The network 2300 is suitably any network and is preferably comprised of physical layers and transport layers, as illustrated by a myriad of conventional data transport mechanisms like Ethernet, Token-Ring™, 802.11(b), or other wire-based or wireless data communication mechanisms as will be apparent to one of ordinary skill in the art.

Placed in data communication with data transport system 2300 is a Server 2302 which is suitably any Server for accommodating selective query support, selective data access, data archiving, and the like, as will be appreciated to one of ordinary skill in the art. Preferably, the Server 2302 is a database server. One or more Clients, such as representative Clients 2314, are also placed, or selectively placed, in data communication with the data transport system 2300. The Client 2314 is preferably configured to interact with Server 2302 as will be appreciated by one who is skilled in the art. It should be noted that the Clients 2314 are suitably thick clients or thin clients, additional servers, PDA's, or any equipment capable of interacting with Server 2302 to send and receive data. Thus, a data path between Server 2302 and the one or more clients, such as representative Client 2314, are in shared data communication.

The Server 2302 preferably comprises a network interface 2308 through which the Server interfaces with data transport system 2300. The Server 2302 also preferably comprises internal storage, which is suitably in the form of RAM and is suitably embodied as a hard disk, optical storage, removable memory, or any other preferably rewritable storage as will be appreciated by those skilled in the art. Preferably stored on internal storage 2310 are an E-model 2304, and S-model 2312, and a graphics server 2306. The graphics server 2306 is suitably any graphics server software as will be appreciated by those skilled in the art. The presently preferred embodiment utilizes the Chart FX software package. The E-model 2304 and S-model 2312 are suitably embodied as computer readable code on a computer readable medium. In the presently preferred embodiment, the E-model 2304 and S-model 2312 are compiled C++ software components. It will be appreciated by those skilled in the art the E-model 2304 and S-model 2312 are suitably any computer readable code for supporting the functionality described herein.

Figure 24:
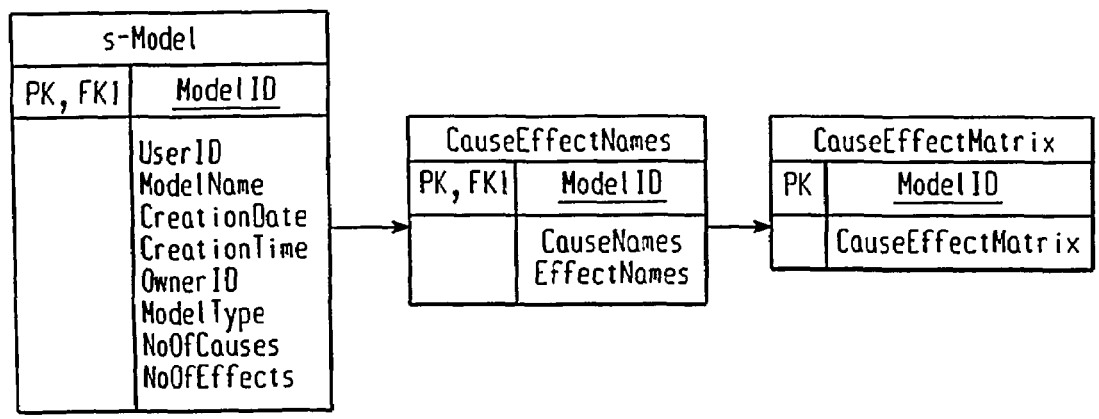
FIG. 24 is an illustration of the structure of the e-model and s-model according to a presently preferred embodiment.
Figure 24:
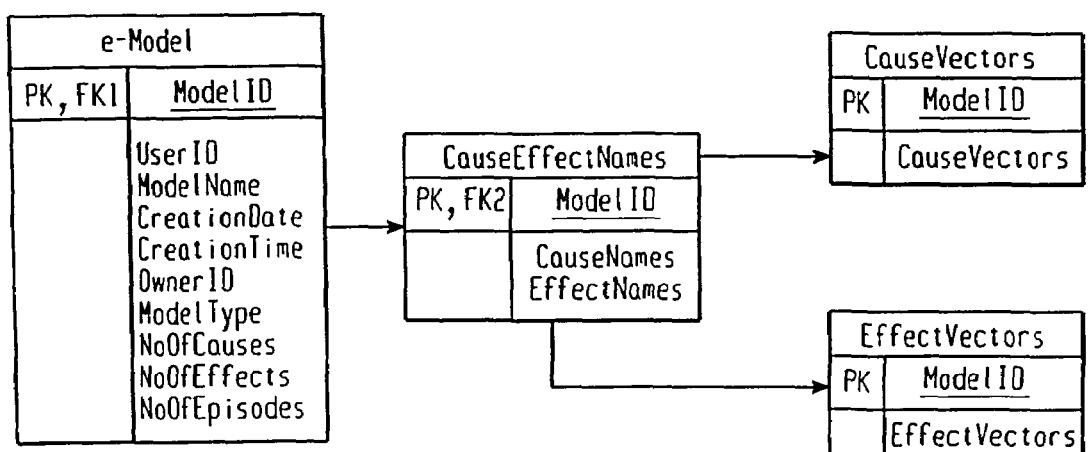

FIG. 24 illustrates the structure of the E-model 2304 and the S-model 2312 according to the presently preferred embodiment.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A computerized method performed on a computer, the method comprising:
providing output on a screen of the computer from a cause-and-effect model, to a user, wherein the providing includes displaying output effect values;
receiving in the computer from the user one or more desired effect values that are different from one or more corresponding of the output effect values; and
modifying, in the computer, the cause-and-effect model as a function of difference between the one or more desired effect values and the one or more corresponding output effect values;
wherein the cause-and-effect model includes a matrix of causes and effects, with numerical values each representing an influence the corresponding cause has on the corresponding effect; and
wherein the modifying includes changing numerical influence values as a function of the difference between the one or more desired effect values and the one or more corresponding output effect values; and
further comprising, prior to the providing the output, constructing the cause-and effect model, wherein the constructing includes:
receiving from the user the matrix of causes and effects, wherein the matrix of causes and effects is entered into the computer using a graphical user interface of the computer; and
receiving from the user the numerical influence values for the matrix.

2. The method of claim 1,
wherein the constructing also includes receiving from the user relative importance values associated with at least some of the causes; and
wherein the modifying includes changing the influence values as a function of both the relative importance values and the difference between the one or more desired effect values and the one or more corresponding output effect values.

3. The method of claim 1, wherein the constructing also includes receiving from the user bias values associated with at least some of the effects.

4. The method of claim 1, wherein the constructing also includes receiving from the user faith values associated with at least some cause-and-effect pairs.

5. The method of claim 1, further comprising, after the constructing and before the providing the output, validating the model, wherein the validating includes:
receiving from the user cause values associated with the causes; and
calculating the output effect values from the causes and the influence values.

6. A computerized method performed on a computer, the method comprising:
providing output on a screen of the computer from a cause-and-effect model, to a user, wherein the providing includes displaying output effect values;
receiving in the computer from the user one or more desired effect values that are different from one or more corresponding of the output effect values; and
modifying, in the computer, the cause-and-effect model as a function of difference between the one or more desired effect values and the one or more corresponding output effect values;
wherein the receiving includes receiving input by the user manipulating the output display on the screen;
wherein the manipulating includes the user clicking and dragging on graphical representations of the output effect values;
wherein the providing includes providing a bar graph of output effect values as the graphical representations of the output effect values;
wherein the cause-and-effect model includes a matrix of causes and effects, with numerical values each representing an influence the corresponding cause has on the corresponding effect; and
wherein the modifying includes changing numerical influence values as a function of the difference between the one or more desired effect values and the one or more corresponding output effect values.

7. The method of claim 6,
wherein the receiving also includes receiving from the user one or more confidence levels associated with respective of the one or more desired effect values;
wherein the modifying includes changing the influence values as a function of both the one or more confidence levels and the difference between the one or more desired effect values and the one or more corresponding output effect values.

8. The method of claim 7,
wherein the model also includes relative importance values associated with at least some of the causes; and
wherein the modifying includes changing the influence values as a function of the relative importance values, the one or more confidence levels, and the difference between the one or more desired effect values and the one or more corresponding output effect values.

9. The method of claim 8,
further comprising, prior to the providing the output, constructing the cause-and effect model, wherein the constructing includes:
receiving from the user the matrix of causes and effects, wherein the matrix of causes and effects is entered into the computer using a graphical user interface of the computer; and
receiving from the user the numerical influence values for the matrix.

10. The method of claim 9, wherein the constructing also includes receiving from the user bias values associated with at least some of the effects.

11. The method of claim 10, wherein the constructing also includes receiving from the user faith values associated with at least some cause-and-effect pairs.

12. The method of claim 9,
further comprising, after the constructing and before the providing the output, validating the model, wherein the validating includes:
receiving from the user cause values associated with the causes; and
calculating the output effect values from the causes and the influence values.

* * * * *